United States Patent [19]
Kalthod et al.

[11] Patent Number: 5,779,897
[45] Date of Patent: Jul. 14, 1998

[54] HOLLOW FIBER MEMBRANE DEVICE WITH INERT FILAMENTS RANDOMLY DISTRIBUTED IN THE INTER-FIBER VOIDS

[75] Inventors: Dilip Gurudath Kalthod, St. Louis; Donald Joseph Stookey, Creve Coeur, both of Mo.

[73] Assignee: Permea, Inc., St. Louis, Mo.

[21] Appl. No.: 748,481

[22] Filed: Nov. 8, 1996

[51] Int. Cl.⁶ .............................. B01D 61/28; B01D 63/02
[52] U.S. Cl. .................. 210/321.8; 210/321.89; 210/500.23; 96/8
[58] Field of Search ................. 96/8; 210/321.78, 210/321.79, 321.8, 321.81, 321.83, 321.87, 321.88, 321.89, 321.9, 500.23

[56] References Cited

U.S. PATENT DOCUMENTS

| | | | |
|---|---|---|---|
| 3,339,341 | 9/1967 | Maxwell et al. | 55/16 |
| 3,503,515 | 3/1970 | Tomsic | 210/321 |
| 4,066,553 | 1/1978 | Bardonnet et al. | 210/321 R |
| 4,293,418 | 10/1981 | Fujii et al. | 210/321.1 |
| 4,368,124 | 1/1983 | Brumfield | 210/321.3 |
| 4,559,884 | 12/1985 | Stoldt et al. | 112/262.1 |
| 4,869,059 | 9/1989 | Austin | 57/210 |
| 4,950,391 | 8/1990 | Weickhardt | 210/321.8 |
| 5,198,110 | 3/1993 | Hanai et al. | 210/321.79 |
| 5,236,665 | 8/1993 | Mathewson et al. | 422/46 |
| 5,364,454 | 11/1994 | Bikson | 96/8 |

FOREIGN PATENT DOCUMENTS

| | | | |
|---|---|---|---|
| 1114307 | 12/1981 | Canada | 210/500.23 |
| 9534373 | 12/1995 | WIPO | 210/500.2 |

*Primary Examiner*—Ernest G. Therkorn
*Attorney, Agent, or Firm*—Mark L. Rodgers

[57] ABSTRACT

The present invention provides a fluid separation module and a process for utilizing the module containing a bundle of hollow fiber membranes and randomly dispersed within the bundle of fibers are filaments having an outer diameter from about 60 to about 3000 microns. The hollow fibers have an outer diameter from about 100 to about 1000 microns. The filaments are present in number from 0.5 to 5 filaments per fiber. Preferably, the filaments are placed among the fibers during manufacturing of the fibers and/or bundle. The presence of the filaments enhances the performance of the fluid separation module.

11 Claims, 11 Drawing Sheets

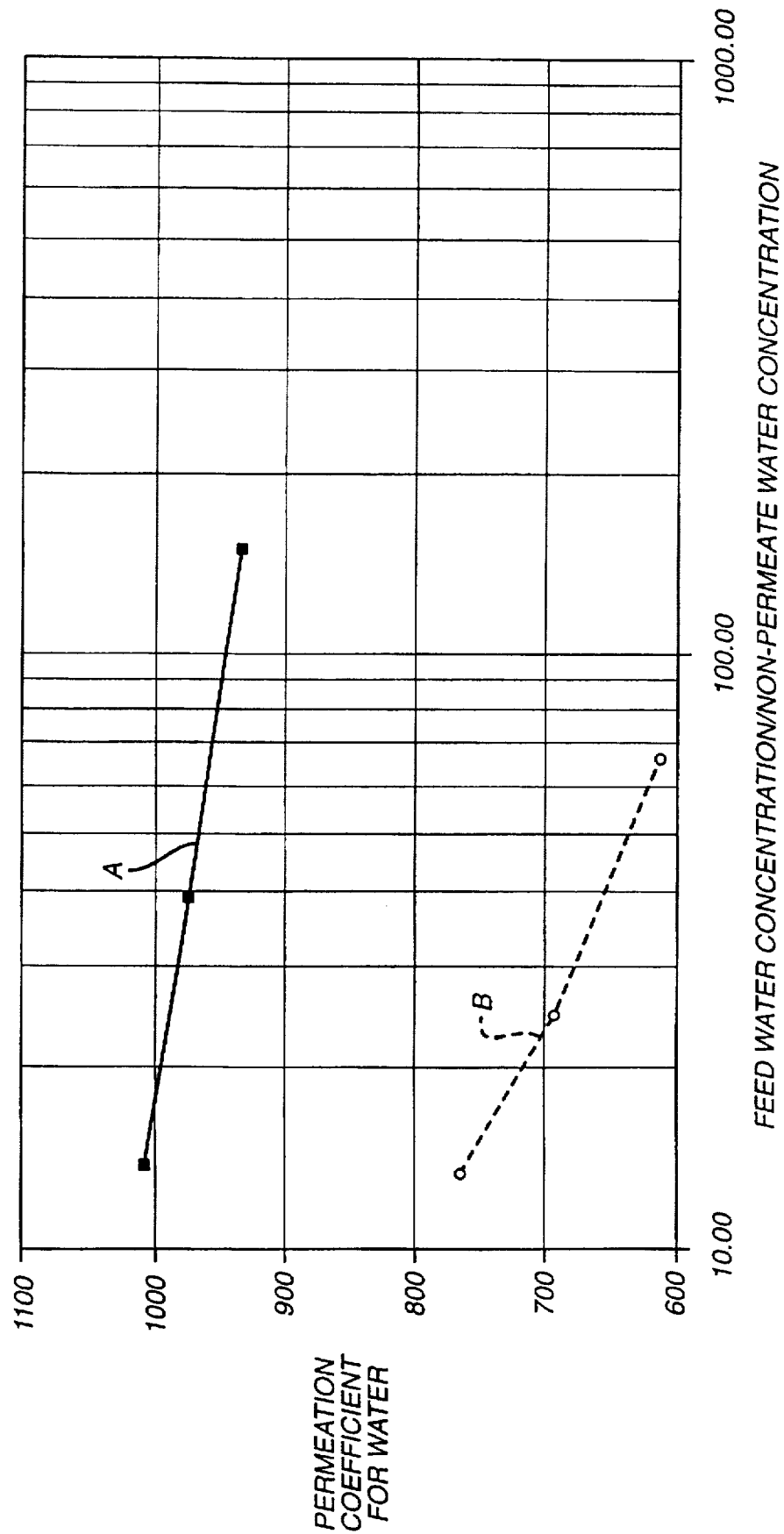

HOLLOW FIBER MEMBRANE DEVICE WITH INERT FILAMENTS RANDOMLY DISTRIBUTED IN THE INTER-FIBER VOIDS

STATEMENT REGARDING FEDERALLY SPONSORED RESEARCH OR DEVELOPMENT

Not Applicable.

CROSS-REFERENCE TO RELATED APPLICATIONS

Not Applicable.

BACKGROUND OF THE INVENTION

A separator module containing a bundle of hollow fiber membranes produces the best possible performance under ideal countercurrent flow, which assumes uniform velocity distribution (or "plug flow") of the fluid on each of the shell and bore sides of the membrane. It is expected that for fiber bores of uniform size and length, the bore side flow approaches plug flow. However, on the shell side non-uniform distribution of axial velocity, i.e., deviation from plug flow, usually exists.

The deviation from plug flow on the shell side is caused by one of a number of factors, for instance, non-uniform spacing of the hollow fibers in the bundle which can occur as a result of methods for bundle formation, or variations in fiber outer diameters, or kinks or waves in the fiber or non-parallel orientation of the fibers, or fiber slippage within a wound bundle, etc.

In a longitudinal hollow fiber bundle, the hydraulic resistance in the radial direction is usually much greater than the hydraulic resistance in the axial direction. The shell side fluid usually enters and exits the bundle at the outside or the center of the bundle. The higher hydraulic resistance in the radial direction prevents the shell side fluid from distributing uniformly over the cross-section of the hollow fiber bundle and thus causes deviation from plug flow.

The net result of the phenomena described above on the performance of the module in a gas separation process is a decrease in the effective permeation coefficient for the fast gas and in the effective selectivity for gas separation as the flow rate or fast gas content of the non-permeate stream is decreased. This results in reduced product (non-permeate) flow per unit of membrane area and reduced product recovery at a given product purity. These deleterious effects are observed in both bore-side feed and shell-side feed gas separations. Some examples of these effects are given below.

In the production of high purity nitrogen from compressed air, the effective oxygen permeation coefficient decreases as the feed velocity is decreased in order to obtain a nitrogen product of higher purity. This causes a reduction in the nitrogen flow rate possible at a specified purity as well as a decrease in the nitrogen recovery quantity. The same is true in the production of high purity hydrogen from a stream containing hydrogen and other species such as methane, ethane, carbon dioxide, etc. In the drying of compressed air, the effective permeation coefficient for water decreases as the feed velocity is decreased in order to obtain a product of lower dew point. This causes a reduction in the product flow rate at a specified dew point as well as an increase in the permeate loss fraction. The same effect occurs in the drying of high pressure natural gas resulting in increased methane losses.

These gas separation processes may be operated as bore-side feed or shell-side feed. The above deleterious effects also occur if the fast gas content of the non-permeate is decreased by increasing the flow rate of a sweep gas on the permeate side. The sweep gas may be an external stream or it may be a portion of the non-permeate or feed streams.

The shell-side gas flow typically approaches uniform plug flow as the fiber length in the separator is increased. However, both the feed and the permeate streams experience increased pressure drops as the separator length is increased. This has an adverse effect on performance. Furthermore, increasing the separator length may also increase the cost of a separator as well as increasing the complexity of assembly of the separator module.

In certain circumstances, it may be preferred to connect separator modules in parallel to process a given gas stream. This reduces the pressure drops and allows sweep of the entire membrane surface in a countercurrent mode by the total permeate; this configuration can produce the highest possible performance. However, this parallel configuration lowers the feed velocity and thus deviations from plug flow on the shell side may cause unacceptable performance. Generally if the parallel configuration causes unacceptable performance, the banks of separator modules may be connected in series. However, the series configuration has certain problems such as an increase in the pressure drop of both the feed and the permeate streams. Furthermore, it requires additional ports and "plumbing" to connect the permeate streams in series; on the other hand, if the permeate streams are not connected in series, a potential performance increase is lost.

In order to improve the performance of the membrane gas separation processes delineated above, a separator module is needed with improved flow distribution particularly on the shell side.

Usually the mass transfer coefficient in the shell side boundary layer is much greater than the intrinsic permeation coefficient of the fiber and hence has little effect on the effective permeation coefficient. However, if the intrinsic permeation coefficient of the fast gas in the hollow fiber is comparable in magnitude or greater than the external mass transfer coefficient, the effective permeation coefficient is limited by the value of the external mass transfer coefficient; thus improved performance will be obtained when increasing the external mass transfer coefficient. This situation may arise as materials of high gas permeability are made available in the fabrication of hollow fibers.

Although the discussions above have been limited to the separation of gases, the separator modules containing a bundle of hollow fiber membranes are also used in operations including gas/liquid contacting, pervaporation, reverse osmosis, dialysis, ultrafiltration, and microfiltration in each of which the external mass transfer coefficient plays a significant role in the performance. Thus an improvement in the external mass transfer coefficient will produce an improved performance and perhaps allow a smaller module to be used resulting in a reduction in overall systems and operations costs.

Many attempts have been made to improve the uniformity of flow distribution on the shell side and to increase the external mass transfer coefficient. For example, U.S. Pat. No. 3,339,341 to Maxwell, et al. describes a permeation device in which a flexible sleeve is placed around the hollow fiber bundle in an attempt to compact the bundle and ostensibly to obtain high packing densities. However, the uneven distribution of flow throughout the cross-section of the bundle still occurs in such a device because of the factors discussed above.

U.S. Pat. No. 3,503,515 to Tomsic describes a permeation assembly in which the void spaces between the hollow fibers are substantially filled by inert particulate solids. Ostensibly, the inert particulate solids reduce the amount of voids thereby causing the fluid feed to contact the total outside surface area of the hollow fibers. However, it is expected such a device would possess substantially increased hydraulic resistance in the radial direction resulting in prevention of the fluid from penetrating the hollow fiber bundle causing the axial flow over the cross-section of the bundle to be very uneven. Furthermore, this kind of device is difficult to manufacture and during operation the passage of fluid on the shell side would cause particle motion and could result in abrasion of the outer surface of the fibers. Also, migration of particles and loss thereof from the separator resulting in contamination of downstream equipment may occur.

U.S. Pat. No. 4,066,553 to Bardonnet, et al., describes a hollow fiber bundle in which the hollow fibers are spaced and kept out of contact with each other by thread-like elements wound spirally around the fibers. The objective is to prevent "dead zones" and provide a compact apparatus of higher contacting efficiency and low pressure drop. However, such a device is expected to have a lower active area per unit volume since fewer fibers can be packed into the separator module because of the presence of the thread used for spacing. Furthermore, the use of a spacer yarn of small diameter selected to obtain a high hollow fiber packing density causes the winding of the spacer yarn around the hollow fiber to be extremely difficult to perform and hence, causes routine mass production to be impractical.

U.S. Pat. No. 4,293,812 to Fujii, et al., describes a module containing a bundle of hollow fibers in which a spacer yarn composed of a textured yarn is spirally wound around one or two hollow fibers. The apparent thickness of the spacer yarn is 0.5 to 3 times the outer diameter of the hollow fiber, which outer diameter is 50 to 600 microns. The windings are regular, and the number of windings of the spacer yarn around each hollow fiber is 0.5 to 20 per 10 mm length of the hollow fiber. The hollow fiber packing ratio in the separator is 30 to 78%. The objective is substantially the same as the Bardonnet, et al. patent discussed above as are the problems with the suggested solution. Furthermore, when it is intended to obtain a hollow fiber packing ratio as high as 60% or above, the bundle of hollow fibers must be squeezed so as to have a decreased diameter prior to the incorporation into a tubular casing of a fluid separator. This squeezing is likely to be accompanied by damage to the hollow fibers and hence by a poor assembly yield.

U.S. Pat. No. 4,559,884 to Stoldt, et al., and U.S. Pat. No. 4,869,059 to Austin describe consolidating hollow fibers into bundles by either sewing a seam wrapping around the hollow fibers or by helically winding yarn around a group of fibers. The objective in each instance is to provide a bundle that can be handled with reduced fiber breakage and damage.

U.S. Pat. No. 4,950,391 to Weickhardt describes adding a very small quantity of threads (typically 4-10% of the number of hollow fibers) to a hollow fiber module suitable as a blood dialyzer. The threads are preferably textured yarn so as not to block the flow of the dialyzate. The threads are distributed evenly over the cross section of the bundle so that the cross section is filled with the threads in a resilient and elastic way. The system is specifically designed for processing liquids such as blood.

U.S. Pat. No. 5,236,665 to Mathewson, et al., describes a hollow fiber device in which inert fibers are spaced between adjacent hollow fibers comprising a warp and then additional inert fibers comprising a weft extend transversely to and over and under the warp in an alternating pattern to form a hollow fiber weave. The stated objective is to reduce the void volume of the hollow fiber device and produce uniform flow over the cross-section. The provision of a hollow fiber weave pattern causes a substantial decrease in the fiber packing density and hence reduces the active area and separation capacity of the unit. Furthermore, the hollow fiber may be damaged during the process of weaving the inert fibers.

World Patent Application No. WO 95/34373 to Reinhart et al. describes a dialyzer containing hollow fiber membranes, each of which has a monofilament spacer spirally disposed or formed on the outer surface of the fiber. The spacer is from 9–18% of the diameter of the hollow fibers. The spacers prevent contact of one fiber with another fiber along the fiber length, and define and maintain consistent prescribed spacing distances between the outer surfaces of adjacent membranes.

The present invention provides a separator module containing a bundle of hollow fiber membranes within which the uniformity of the fluid flow distribution on the shell-side is improved and the effective mass transfer coefficient for the faster permeating species is increased resulting in improved performance of the module.

BRIEF SUMMARY OF THE INVENTION

The present invention provides a fluid separation module containing a bundle of hollow fibers which are membranes and which are of substantially uniform inner and outer diameters and length. Each hollow fiber has an outer diameter (OD) from about 100 to about 3000 microns. The bundle has randomly interspersed therein filaments having an OD no more than about three times the OD of the hollow fibers, but substantially the same length as the hollow fibers and substantially parallel to the hollow fibers. The filaments are present in number from about 0.5 to about 5 filaments on the average for each of the hollow fibers. Each of the filaments has an OD from about 60 microns to about 3000 microns. The term "filament" used herein is any inert material having length with a relatively small cross section which when used in the present invention remains substantially parallel to the fibers in the bundle and does not have a tendency to wrap around the fibers. Suitable filaments include monofilaments, multiple filament untwisted yarn, multiple filament twisted yarn, thread and the like. The packing density of the hollow fibers in the bundle can range from about 10% to about 75%. The packing density is defined as the fraction of the cross-sectional area of the module occupied by the hollow fibers; the cross-sectional area of the module is based on its internal diameter and the cross-sectional area of the hollow fibers is based on their outer diameter.

The fluid separation module also contains at least one tube sheet wherein the hollow fibers and filaments are embedded therein and the hollow fibers penetrate the tube sheet.

In one manufacturing process, the hollow fiber after extrusion is wound on bobbins and the bobbins are then washed to remove the solvents from the fiber. In order to assemble a bundle of fibers, one method is to unwind the hollow fiber under controlled tension and wrap the fiber around the circumference of a large diameter wheel. A traversing guide lays the fiber down on the wheel to form a "skein" of width set by the transverse stroke length and consisting of multiple wraps around the wheel. This process is called "skeining". The skein is then cut to form straight lengths of fibers. The appropriate number of skeins are packed together by suitable means to form a cylindrical bundle of the required diameter. One method for forming the cylindrical bundle is by hanging the skeins vertically on a bundling rack of suitable geometry and then drawing them into a uniformly packed bundle by such means as a plastic wrap or elastic straps placed around the bundle.

Another method of forming a bundle is to unwind the hollow fiber at controlled tension from the bobbins and deliver the hollow fiber through a set of pulley guides to the feed carriage of a filament winding machine. The fiber is drawn onto the mandrel as it is rotated. Simultaneously a traversing guide travels along the mandrel. The guide may move radially (i.e., perpendicular to the mandrel) and rotate. The position and orientation of the fibers is determined by these various motions which are controlled by a computer. Several winding patterns are possible, e.g. helical, circumferential, polar, etc. The fiber may be wound as a single fiber but typically as a group of several fibers. The winding is ended when a wound package of the required diameter is built up.

The separator module of the present invention contains hollow fibers in a bundle with filaments of suitable diameter randomly interspersed in the void spaces between the hollow fibers. Generally these filaments are introduced during the skeining or mandrel winding process, however the filaments may also be introduced at the time that the fibers are first formed. The filaments generally run parallel to the hollow fibers and thus occupy the void spaces between the hollow fibers. Though randomly distributed in the void spaces the filaments usually are somewhat uniformly spread throughout the cross section of the hollow fiber bundle. The presence of the filaments helps to improve the uniformity of the axial flow distribution on the shell side over the cross-section of the separator. It is believed that the uniformity of axial flow distribution is improved because of the increase in the hydraulic resistance in the axial direction. The increase in the hydraulic resistance is related to the decrease in hydraulic diameter (i.e., void volume). It should also be noted that the presence of the filaments increases the shell side (external) mass transfer coefficient. The filaments are preferably thread, multiple-filament twisted yarn, multiple filament untwisted yarn, or monofilament having an OD smaller than that of the hollow fiber.

The invention also may be practiced in such a manner as to maintain the performance of a separator of given size when its active membrane area needs to be decreased in order to compensate for high intrinsic permeation coefficients. In this case, additional inert filaments are added to act as a filler which allows maintenance of uniform flow distribution on the shell side and continues effective mass transfer.

The present invention also relates to a process for separating at least one fluid in a mixture of fluids from at least one other fluid in the mixture of fluids by selective permeation of at least one fluid through a bundle of hollow fiber membranes. The hollow fiber membranes are of substantially uniform inner and outer diameters, the bundle having randomly dispersed therein filaments having an outer diameter no more than three times that of the hollow fibers but substantially the same length as the hollow fibers, the hollow fibers having an outer diameter from about 100 to about 3000 microns and the filaments having an outer diameter from about 60 to about 3000 microns, the filaments being present in number from about 0.5 to about 5 times the number of hollow fibers. The process comprises contacting the fluid mixture with one surface of the hollow fiber membranes which with respect to at least one pair of fluids of the fluid mixture the hollow fiber membranes exhibit selective permeation of one fluid of the pair of fluids over that of the remaining fluid of the pair of fluids. At least one permeating fluid is permeated into and through the hollow fiber membranes. The permeate is removed from the opposite surface of the hollow fiber membranes to provide a permeated product having a different proportion of the at least one fluid of the mixture of fluids than the proportion in the mixture of fluids of the at least one fluid to the at least one other fluid.

BRIEF DESCRIPTION OF THE SEVERAL VIEWS OF THE DRAWINGS

FIG. 11 is a graph depicting the efficiency of a further embodiment of the present invention.

DETAILED DESCRIPTION OF THE INVENTION

Figure 1:
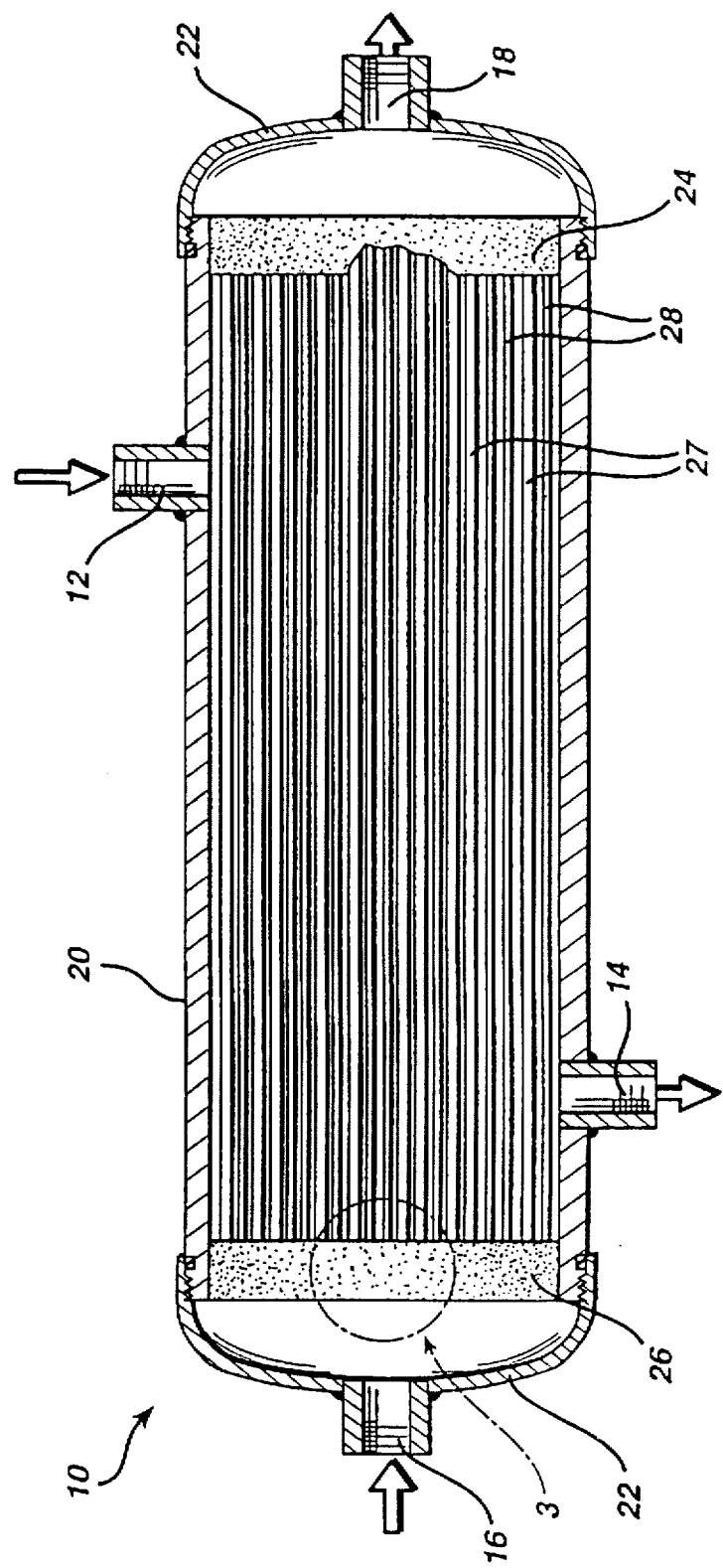
FIG. 1 is an elevational view partially fragmented of one embodiment of the present invention.

FIG. 1 depicts a separation module 10 having a shell side feed port 12 and a shell side exit port 14. The module 10 is a double ended separator having two tube sheets 24 and 26. The hollow fibers 27 penetrate both tubesheets 24 and 26. The filaments 28 also extend at least most of the way through the tube sheets 24 and 26. The bores of the hollow fibers 27 are reached through the bore side feed port 16 and any bore side gas flow exits through the bore side exit port 18. The module 10 has a cylindrical center portion 20 containing the hollow fibers 27 and the filaments 28, and end caps 22. The module 10 may be used in moderate pressure operations or in very high pressure processes. The latter requires a module with suitable seals to be placed in a high pressure shell. The module 10 may be used for shell side feed operations where any sweep gas is fed through the bores, or the module may be used for bore side feed with the sweep being supplied on the shell side. If an external sweep is not utilized, the port 16 may be eliminated in a module having shell side feed, and the port 12 may be eliminated in a module having bore side feed.

Figure 2:
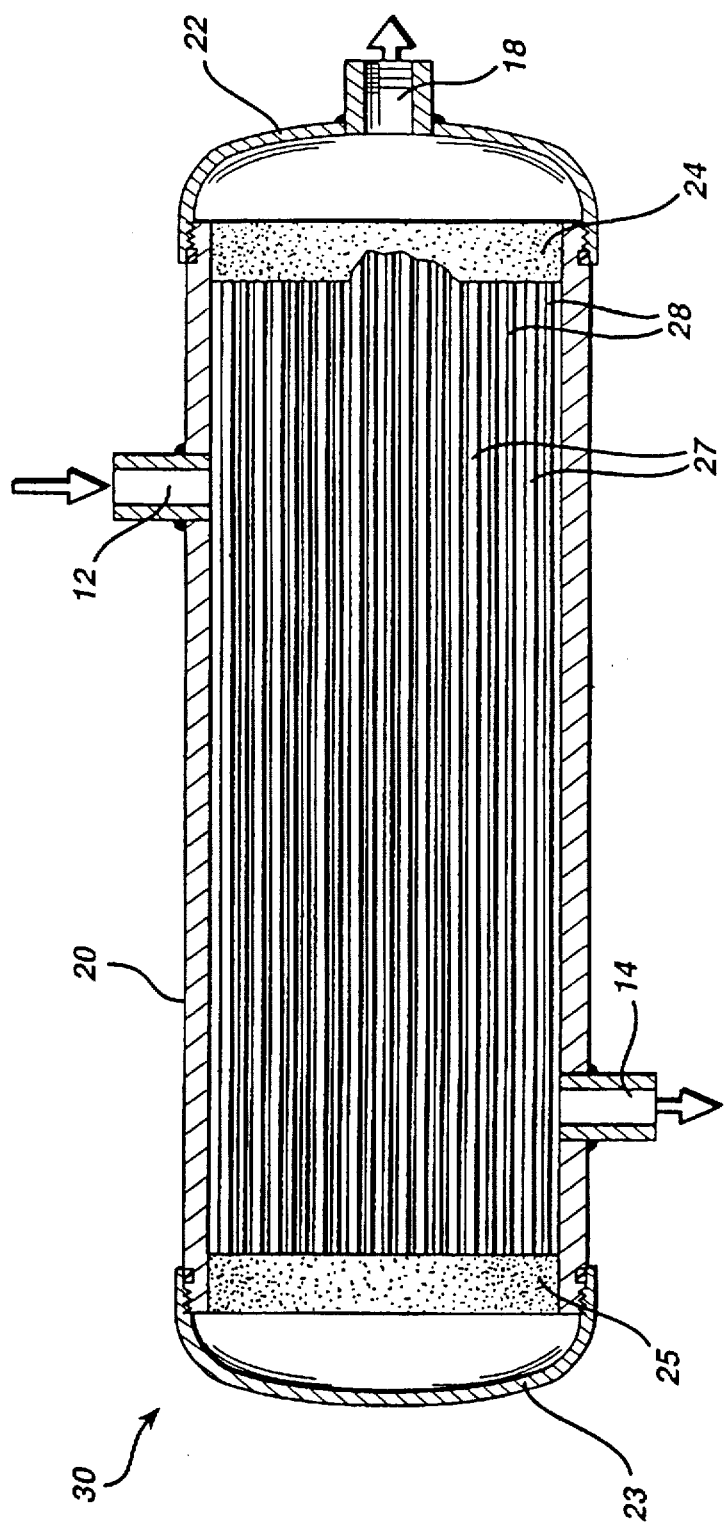
FIG. 2 is an elevational view partially fragmented of another embodiment of the present invention.

FIG. 2 provides a separation module 30 which differs from the module 10 in that the module 30 has an end cap 23 without a port and the fibers 27 do not penetrate the tubesheet 25. The module 30 is utilized in processes where a sweep gas is not needed. The feed gas is fed through the port 12 on the shell side and the non-permeate exits at the port 14 and the permeate exits through the fiber bores at the port 18.

Figure 3:
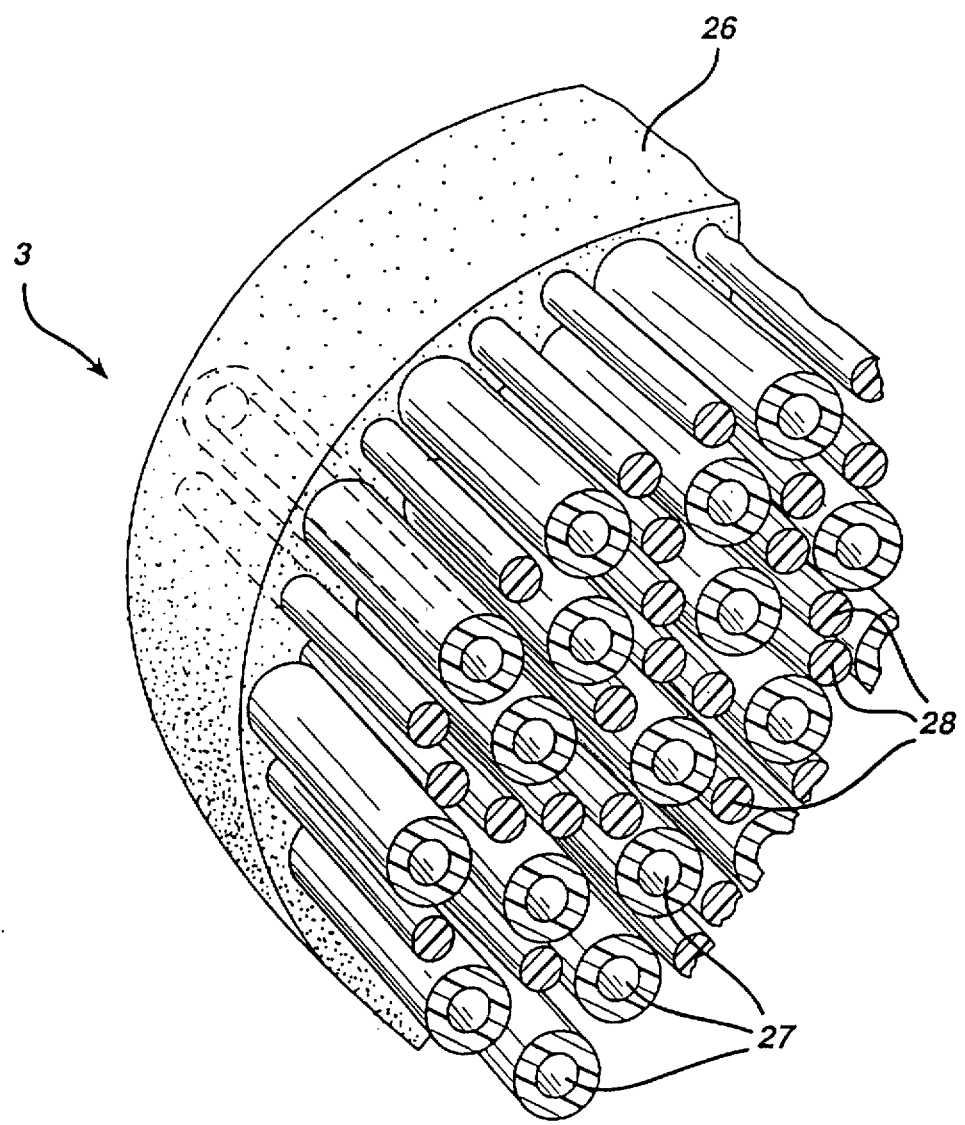
FIG. 3 is a perspective view of an enlarged fragment 3 taken from FIG. 1.

FIG. 3 illustrates the relationship of the hollow fibers 27 and the filaments 28 in an enlarged view from the fragment 3 from FIG. 1. The filaments 28 when skeined with the hollow fibers 27 fit in the void spaces among the hollow fibers 27.

The diameter of the filament and the number of filaments per hollow fiber should be selected to obtain the best performance in a given application. Generally as the number of filaments per hollow fiber and/or the diameter of the filament is increased, the uniformity of axial velocity distribution increases as does the shell side mass transfer coefficient. However, the number of hollow fibers that can be packed into a given cross-sectional area will decrease leading to reduced active membrane area unless the filaments are small enough to occupy the void spaces between the hollow fibers at the desired packing density of the fibers. The number of filaments per hollow fiber and the diameter of the filaments can be optimized from experimental data in combination with calculations.

The improvement in the uniformity of axial flow distribution is related to the increase in the hydraulic resistance in the axial direction. From analogy to laminar flow through a packed bed, it can be shown from theory that for a bundle of hollow fibers with filaments randomly interspersed in the void spaces the following equation applies:

$$\frac{\Delta P}{L} = K_z v_o \qquad (1)$$

where $\Delta P$ is the pressure drop in the axial direction, L is the length of the hollow fiber bundle, and $v_o$ is the superficial velocity and $K_z$ is the axial pressure drop coefficient given by:

$$K_z = \frac{32\mu}{\epsilon D_H^2} \qquad (2)$$

where $\mu$ is the viscosity of the fluid, $\epsilon$ is the void fraction of the hollow fiber bundle and $D_H$ is the hydraulic diameter defined by $$D_H = 4 \times \frac{\text{Open area for flow}}{\text{Wetted Perimeter}}$$

It can be shown that:

$$D_H = D \frac{\epsilon}{\left[1 + \rho_0 \frac{D}{a}\left(1 + m\frac{c}{a}\right)\right]} = \qquad (3)$$

$$D \frac{\left[1 - \rho_0\left(1 + m\frac{c^2}{a^2}\right)\right]}{\left[1 + \rho_0 \frac{D}{a}\left(1 + m\frac{c}{a}\right)\right]}$$

where $\rho_0$ is the fiber packing density (without filaments), a is the outer diameter of the hollow fiber, c is the outer diameter of the filament, m is the ratio of the number of filaments per hollow fiber, and D is the diameter of the hollow fiber bundle.

Hence the equation for the axial pressure drop coefficient can be written as:

$$K_z = \frac{32\mu}{\epsilon^3}\left[\frac{1}{D} + \frac{\rho_0}{a}\left(1 + m\frac{c}{a}\right)\right]^2 \qquad (4)$$

The above equations can be used to estimate the effect of the diameter of the filaments and number of filaments per hollow fiber on the axial pressure drop coefficient. It is expected that uniformity of axial flow distribution increases as the axial pressure drop coefficient increases. However, the shell side pressure directly affects the driving force for the separation. Hence, if axial pressure drop is too high, the driving force for separation may be reduced. Thus, it is apparent that an optimum exists for the diameter and number of filaments selected per hollow fiber.

The maximum filament diameter is defined as that which fits into the void spaces between the fibers arranged in a regular geometric pattern. This value can be calculated as a function of the packing density of the fiber and the diameter of the hollow fiber. Packing density, expressed as per cent, is the fraction of the bundle cross-section occupied by the hollow fiber membranes. The calculated values can be used to obtain an estimate of the upper limit of the filament diameter that can be used in the present invention. However, because of certain deviations from a regular geometric arrangement, (i.e., non-uniform packing, fiber diameter variations, kinks in the fiber, etc.), the above calculated value may deviate from the upper limit of the filament diameter that can be used in practice.

For a cubic arrangement of the hollow fibers with one filament per fiber, the relationship between the maximum filament diameter (c max), the fiber packing density ($\rho$) and the fiber diameter (a) is given by the following equation:

$$c \text{ max}/a = 1.2533/\rho^{0.5} - 1 \qquad (5)$$

The values of c max/a calculated from the above equation are as follows:

TABLE 1

| ρ%  | c max/a |
|-----|---------|
| 10  | 2.96    |
| 15  | 2.24    |
| 20  | 1.80    |
| 25  | 1.51    |
| 30  | 1.29    |
| 35  | 1.12    |
| 40  | 0.982   |
| 45  | 0.868   |
| 50  | 0.772   |
| 55  | 0.690   |
| 60  | 0.618   |
| 65  | 0.555   |
| 70  | 0.498   |
| 75  | 0.447   |

Table 1 indicates the range of fiber packing densities which are generally of interest and the corresponding theoretical upper limit of the filament diameter.

Suitable filaments include inert materials such as multiple-filament untwisted yarn, multiple-filament twisted yarn, thread, monofilaments, multiple strand filaments, etc. of the types used in textiles, sewing, composite materials and other industrial applications. Suitable polymers for the inert filaments include nylon and other polyamides, and polyaramides, polyester, acrylic, polypropylene, etc. Other materials suitable for filaments include graphite and glass. The filament used should withstand the operating conditions of temperature and pressure without failure and be compatible with the potting resin used to cast the tubesheet seals, and with the various species present in the stream or streams to be processed.

Examples of the types of hollow fibers used in the separator module of the present invention include the following:

(a) polymeric, integrally skinned, asymmetric hollow fibers spun from polysulfone, polyimide, polyamide, polyarylate, etc.;

(b) dense walled, polymeric hollow fibers spun from polymethylpentene, etc.;

(c) thin film composite, polymeric hollow fibers made by coating a porous hollow fiber with a selective polymer;

(d) polymeric hollow fibers surface-modified by reactive species (e.g., oxygen, fluorine, etc.);

(e) polymeric hollow fibers containing an active transport agent;

(f) hollow tubes of porous, ceramic material with a selective layer;

(g) hollow tubes of ion transport, ceramic material;

(h) glass fibers; and (i) carbon fibers, and the like.

Suitable polymers for the manufacture of hollow fiber membranes may be selected from substituted or unsubstituted polysulfone, polystyrene, acrylonitrile-styrene copolymer, styrene-butadiene copolymer, styrene-vinylbenzylhalide copolymer, polycarbonate, cellulose acetate, cellulose propionate, ethyl cellulose, methyl cellulose, nitrocellulose, polyamide, polyimide, aryl polyamide, aryl polyimide, polyether, polyetherimide, polyarylene oxide, polyphenylene oxide, polyxylylene oxide, polyesteramide-diisocyanate, polyurethane, polyester, polyarylate, polyethylene terephthalate, polyalkyl methacrylate, polyalkyl acrylate, polyphenylene terephthalate, polysulfide, polysiloxane, polyethylene, polypropylene, polybutene-1, poly-4-methyl pentene-1, polyvinyl chloride, polyvinyl fluoride, polyvinylidene chloride, polyvinylidene fluoride, polyvinyl alcohol, polyvinyl acetate, polyvinyl propionate, polyvinyl pyridine, polyvinyl pyrrolidone, polyvinyl ether, polyvinyl ketone, polyvinyl aldehyde, polyvinyl formal, polyvinyl butyral, polyvinyl amine, polyvinyl phosphate, polyvinyl sulfate, polyacetal, polyallyl, polybenzobenzimidazole, polyhydrazide, polyoxadiazole, polytriazole, polybenzimidazole, polycarbodiimide, polyphosphazine, polypropylene oxide, and interpolymers, block interpolymers, copolymers, block copolymers, grafts and blends of the foregoing as well as other suitable materials.

Applications for which the present invention is suitable includes separation of fluids, e.g. solids, liquids, gases or combinations thereof. Gas separations include separations such as production of high purity nitrogen from compressed air, separation of hydrogen from refinery streams and ammonia purge gas, hydrogen/carbon monoxide ratio adjustment in syngas, removal of acid gases such as carbon dioxide and hydrogen sulfide from natural gas, removal of nitrogen from natural gas, production of enriched oxygen from air, olefin separations, for example, ethylene from propane, removal of water from natural gas, removal of water from compressed gas, and the like. Other suitable gaseous mixtures which may be separated are those which contain at least one of hydrogen, methane, carbon dioxide, carbon monoxide, helium, nitrogen, water vapor or hydrocarbons.

The present invention is also applicable to gas-liquid contacting operations such as dissolving or removing carbon dioxide, or oxygen, or nitrogen in water or other liquids. For instance, a gas can be dissolved in a liquid or removed from a liquid to a predetermined level by placing the liquid under a predetermined pressure; transporting the pressurized liquid to the one side of the hollow fiber membranes of a gas/liquid contactor module containing a bundle of hollow fiber membranes which are of substantially uniform inner and outer diameters, the bundle having randomly dispersed therein filaments having an outer diameter no more than three times that of the hollow fibers but substantially the same length as the hollow fibers, the hollow fibers having an outer diameter from about 100 to about 3000 microns and the filaments having an outer diameter from about 60 to about 3000 microns, the filaments being present in number from about 0.5 to about 5 times the number of hollow fibers; having a gas under pressure on the side of the hollow fiber membranes opposite the side of the liquid; and increasing or decreasing the quantity of the dissolved gas in the liquid by increasing or decreasing the pressure of the gas in the gaseous portion by an appropriate amount to obtain the predetermined level of the dissolved gas. Furthermore, the separator module of the present invention also pertains to pervaporation, reverse osmosis, dialysis, ultrafiltration, microfiltration, and the like of fluids whether they be solids, liquid, gas or a combination thereof.

EXAMPLE 1

Asymmetric polysulfone fibers having an outer diameter (OD) of 460 microns are coskeined with filaments of twisted multi-ply nylon thread having an OD of 300 microns. The ratio of filaments to hollow fibers is 1:1. A separator module, similar to that in FIG. 1, having an inner diameter (ID) of 1.4 inches (3.56 cm) and with a fiber active length of 22 inches (55.9 cm), is assembled from a bundle of the coskeined hollow fibers and filaments. The module contains 15.9 square feet (1.48 square meters) of active membrane area at a hollow fiber packing density of 31.2% or a total packing density (fiber+filaments) of 44.3%. Both ends of the bundle are potted in tubesheets and the tubesheets are opened to expose the fiber bores. The separator module is provided with two ports in between the tubesheets but close to the location of the tubesheets for flow of gas on the shell side of the fibers. These ports are located at opposite ends of the separator module and are 180° apart around the circumference of the module. Ports are also provided at the ends of the module for the flow of gas on the bore side. A similar module is assembled using the same hollow fibers without the filaments. This control module contains 21.3 square feet (1.98 square meters) of active membrane area and has a fiber packing density of 41.6%.

The modules are tested for air drying as follows. Pressurized moist air with a dew point of 3°–17° C. at a pressure of 100 psig ($7.91 \times 10^5$ Pascals), is fed through a port to the shell side of the hollow fiber membranes. The test is conducted at ambient temperature (~25° C.). The bore side is supplied with dry nitrogen to provide a sweep countercurrent to the feed, thereby producing a large driving force for permeation of the water vapor. The flow rates, oxygen content, pressures, temperatures and dew points of the non-permeate, sweep and permeate and the dew point of the feed are recorded. The data are used to calculate the overall permeation coefficient for water from an ideal countercurrent flow model. The units of permeation coefficient, i.e., $k$, are $10^{-6}$ std cc/cm$^2$·sec·cmHg, the "std cc" in the numerator is expressed at 0° C. and 760 mm Hg. The results of the tests on the control module and two coskeined modules are shown in Table 2.

The three modules are tested at about the same amount of water removal (defined as the difference between the water concentrations of the feed and the non-permeate divided by the water concentration of the feed). The water removal in the tests is 97.8–99.2%. The calculated water vapor permeation coefficient, $k_w$, is 1000–1100 for the two coskeined modules and 650 for the control module, i.e., the water vapor permeation coefficient $k_w$ in shell-feed drying is increased by a factor of about 1.6 when using the coskeined module.

TABLE 2

| Separator Type | Active Area m² | Feed Pressure Pascals × 10⁵ | NP Flow slpm | Sweep N₂ Flow slpm | Feed H₂O Removal % | Calc k_w |
|---|---|---|---|---|---|---|
| Control | 1.98 | 8.15 | 54.3 | 10.1 | 97.9 | 653 |
| Coskeined 1 | 1.48 | 7.82 | 50.1 | 9.1 | 99.2 | 1110 |
| Coskeined 2 | 1.48 | 7.56 | 47.4 | 10.1 | 98.8 | 1021 |

EXAMPLE 2

The modules of Example 1 are tested with the moist air feed supplied to the bore side of the fibers in the modules and the dry nitrogen sweep is supplied to the shell side countercurrent to the feed. The results are shown in Table 3 below. The water vapor removal in the tests is 97.5–98.7%. The calculated water vapor permeation coefficient, $k_w$, is 730 for the two coskeined modules and 650 for the control module. The water vapor permeation coefficient in the bore feed air drying is increased about 12% when using the coskeined modules.

TABLE 3

| Separator Type | Active Area m² | Feed Pressure Pascals × 10⁵ | NP Flow slpm | Sweep N₂ Flow slpm | Feed H₂O Removal % | Calc k_w |
|---|---|---|---|---|---|---|
| Control | 1.98 | 8.12 | 49.1 | 10.1 | 98.7 | 646 |
| Coskeined 1 | 1.48 | 7.98 | 48.9 | 9.5 | 98.1 | 738 |
| Coskeined 2 | 1.48 | 7.85 | 48.5 | 9.1 | 97.5 | 730 |

EXAMPLE 3

One control module and one coskeined module of Example 1 are tested with moist air feed supplied to the shell side and a portion of the dry non-permeate supplied as sweep to the bore side countercurrent to the feed. The modules are tested at approximately the same feed flow rate and the sweep flow rate is adjusted to obtain the same non-permeate dew point for both modules. The quantities of interest in assessing performance are the dry product (net non-permeate) flow rate per unit active area and the fraction of feed lost as sweep or permeate (purge loss). The results are shown in Table 4.

For both the coskeined module and the control module, the feed dew point is about 15° C. at inlet and about –40° C. at exit from the module. The water vapor removal is 99.1%. The data show that the net flow rate of dry non-permeate is about 32.3 slpm/m² at a purge loss of 24.3% for the coskeined module, and about 24.8 slpm/m² at a purge loss of 28.7% for the control module. Thus at the same extent of drying, the product flow rate per m² active area is increased about 30% and the purge loss is decreased about 15% when using the coskeined module. Furthermore, the water vapor permeation coefficient ($k_w$) is increased from 650 to 1710, i.e., by a factor of 2.6, when using the coskeined module.

TABLE 4

| Separator Type | Active Area m² | Feed Pressure Pascals × 10⁵ | Feed Flow slpm | Net NP/ Area slpm/m² | Purge Loss Perm/Feed % | Feed H₂O Removal % | Calc k_w |
|---|---|---|---|---|---|---|---|
| Control | 1.98 | 7.91 | 68.3 | 24.6 | 28.7 | 99.1 | 650 |
| Coskeined | 1.48 | 7.86 | 63.7 | 32.6 | 24.3 | 99.2 | 1714 |

EXAMPLE 4

Asymmetric hollow fiber membranes of polyetherimide polymer with an outer diameter (OD) of 325 microns are coskeined with a nylon monofilament with an OD of 100 microns. The ratio of coskeined filament to hollow fibers is 1:1. A module having an inner diameter (ID) of 3.9" (9.91 cm) and about 39" (99.1 cm) of active fiber length is assembled from a bundle of the coskeined fiber. The module contains about 479 ft² (44.5 m²) of active membrane area at a fiber packing density of 45.9% for the hollow fibers and 50.3% total packing density (fiber+monofilament). Both ends of the module are potted in tubesheets. The fibers penetrate the tubesheets which are opened to expose the fiber bores on the outside of the tubesheet. The module shell is provided with four ports at each end, close to the tubesheets. Ports are also provided at the ends for the flow of gas on the bore side. The module is placed in an outer steel housing with flanged end caps. A seal is provided to prevent any leakage between the feed and the non-permeate. A similar module is assembled using the same hollow fibers but without the coskeined filaments. This control module contains 577 ft² (53.6m²) active membrane area at a fiber packing density of 55.5%.

Each of the modules is subjected to the flow of dry air at 100 psig ($7.91 \times 10^5$ Pascals) at ambient temperature on the shell side with the bore side open to the atmosphere. The pressure drop on the shell side is measured as a function of the feed flow rate. The coskeined module shows a higher pressure drop than the control module, and hence, an improved performance is expected from the coskeined module.

Figure 4:
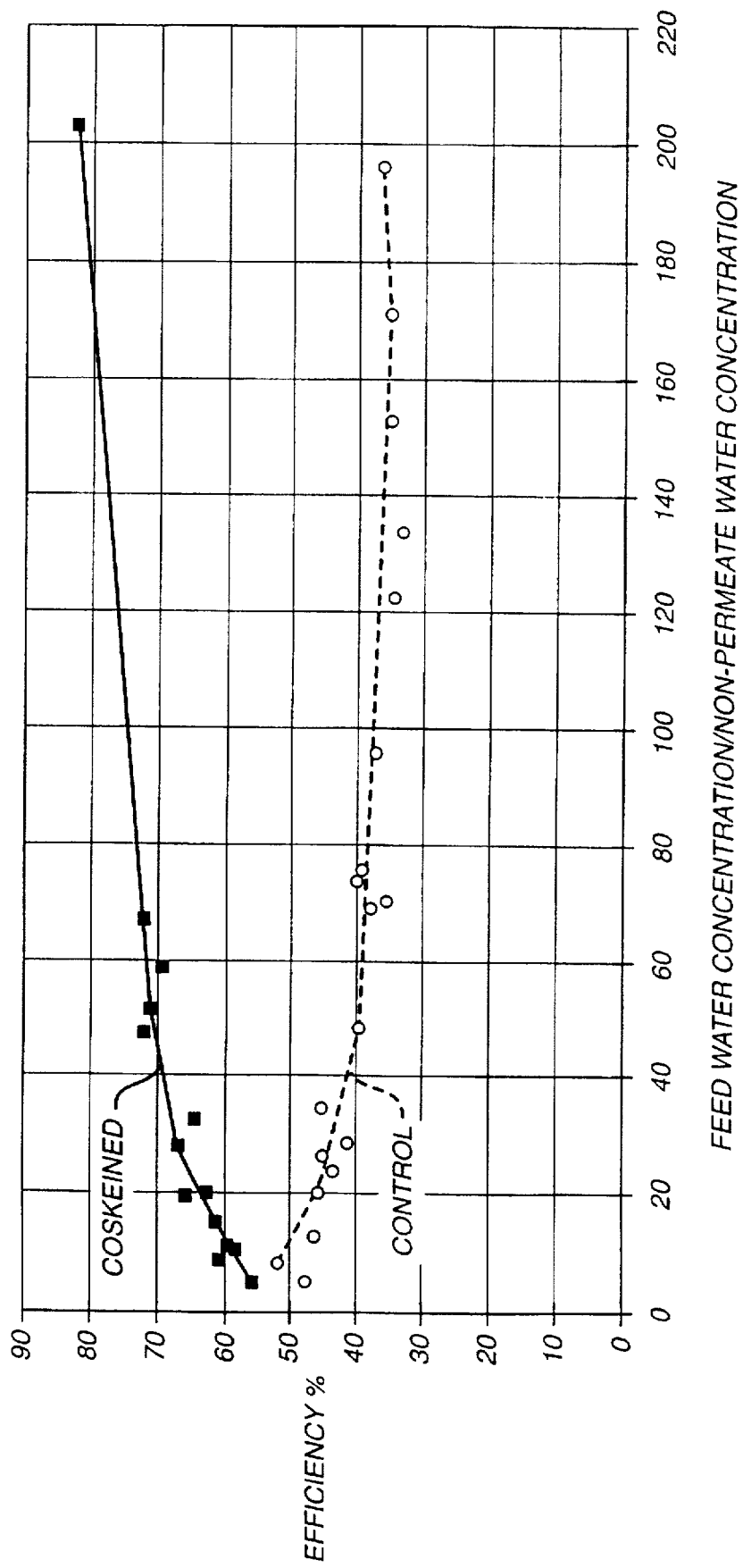
FIG. 4 is a graph depicting the efficiency of one embodiment of the present invention.

The modules are tested for air drying. Moist air at a dew point of 3°–25° C. and at a pressure of 100 psig ($7.91 \times 10^5$ Pascals) at ambient temperature is supplied to each module through the shell side port. The dry non-permeate product is withdrawn from the shell port at the opposite end of the module. A fraction of the dry non-permeate product is depressurized and supplied as sweep to the bore side countercurrent to the feed in order to increase the driving force for water vapor permeation. The flow rates, oxygen content, pressures, temperatures, and dew points of the non-permeate, sweep and permeate and the dew point of the feed are recorded. Such tests are conducted at several feed and sweep flow rates to vary the amount of water vapor removed. The data are used to calculate the permeation coefficient of water vapor from an ideal countercurrent flow model. The units of permeation coefficient k are $10^{-6}$ std cc/cm$^2$·sec·cmHg. Test loops consisting of a representative sample of the fibers are used to measure the intrinsic permeation coefficient of the fiber for water vapor. This value depends upon the fiber structure only and is independent of the module design. Non-uniformity of flow and other factors cause the k for the module to be lower than the intrinsic k. The ratio of the k for the module to the intrinsic k represents an efficiency factor. The results of the air drying test on the control module and the coskeined module are expressed as plots of k/intrinsic k versus feed water concentration/non-permeate water concentration in FIG. 4.

The results indicate that for the feed water/non-permeate water values in the range of ~20–200, the efficiency factor for the coskeined module is 63–82%, whereas the efficiency factor for the control module is 36–46%. It should be noted that the efficiency factor for the coskeined module increases as the feed water/non-permeate water ratio increases, whereas the efficiency factor for the control module decreases as the feed water/non-permeate water ratio increases.

The performances of the control and coskeined modules are compared in Table 5 below. It should be noted that in spite of the smaller active area in the coskeined module, it produces about 37% higher flow rate of dry product gas compared to the control module. On a per square meter basis of membrane area, the coskeined module produces about 65% higher flow rate of dry product gas as compared to the control module.

Figure 5:
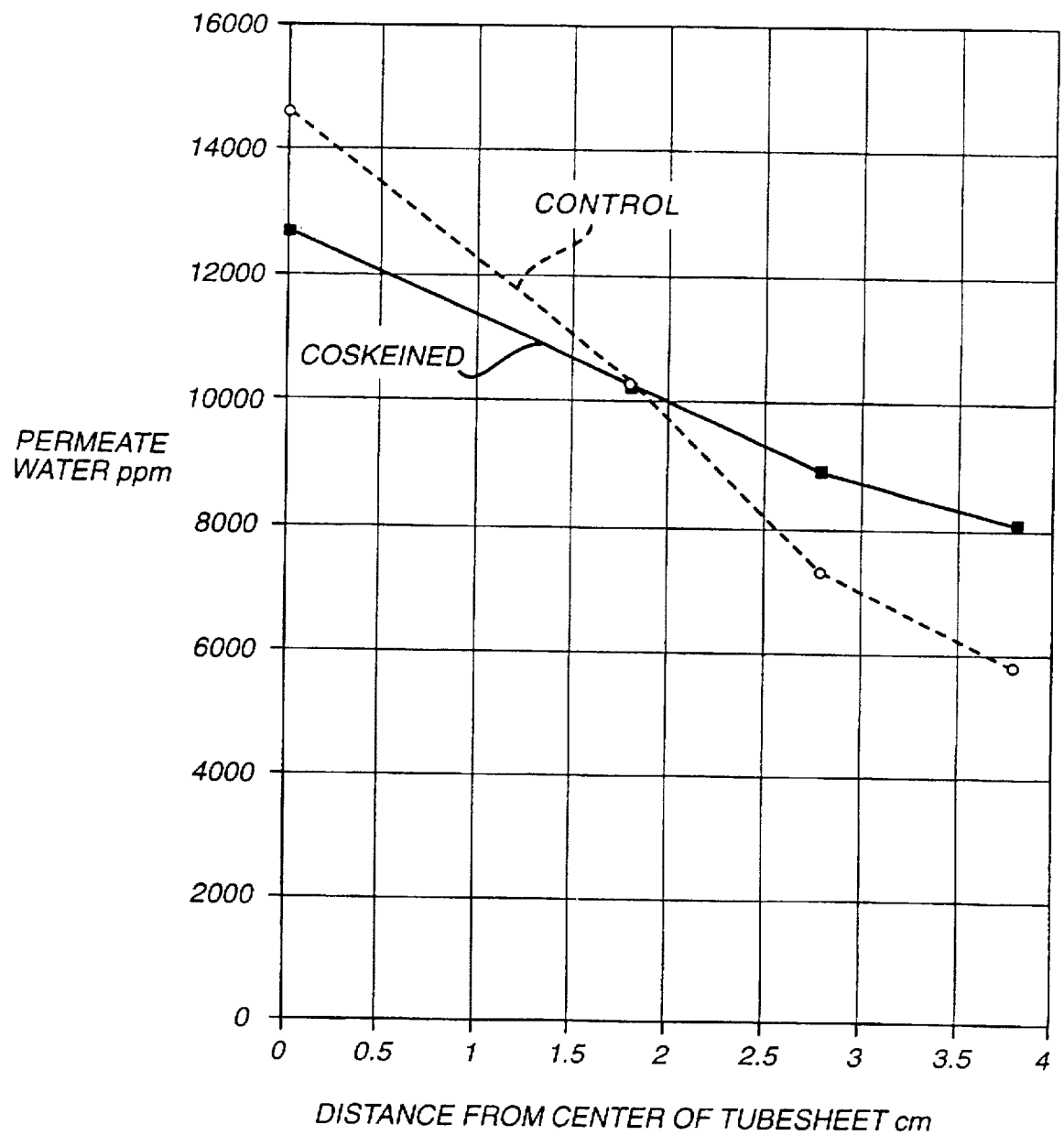
FIG. 5 is a graph depicting the results of one embodiment of the present invention.

The variation of water concentration of the permeate gas over the tubesheet is a good indicator of the flow distribution in the module. This is measured over two diametrical axes 90° apart by moving a sample probe over the surface of the permeate side tubesheet and recording the dew point as a function of position. The results are averaged, and plots of permeate water ppm versus distance from the center of the tubesheet are shown in FIG. 5. It is noted that the coskeined module shows a flatter permeate water profile indicating a more uniform flow distribution compared to the control module. This is supported by the superior performance of the coskeined module.

TABLE 5

| Separator Type | Active Area m$^2$ | Feed Pres Pascals ×10$^5$ | Sweep/ Feed % | Net NP Flow slpm | H$_2$O Removal % | NP Flow/ Area slpm/m$^2$ |
| --- | --- | --- | --- | --- | --- | --- |
| Coskeined | 44.5 | 7.35 | 31.9 | 619.1 | 99.5 | 13.9 |
| Control | 53.6 | 7.52 | 34.1 | 452.2 | 99.3 | 8.44 |

EXAMPLE 5

Two modules are assembled using the procedures of Example 4. Polyimide asymmetric hollow fibers with a 325 micron OD are coskeined with nylon monofilament of 100 micron OD. The ratio of coskeined filaments to hollow fibers is 1:1. A module having an ID of 3.9" (9.91 cm) and about 39" (99.1 cm) active length is assembled from a bundle of the coskeined fibers and filaments. The module contains 479 square feet (44.5 square meters) of active area at a fiber packing density of 45.9%, or a total packing density, including the hollow fiber and the monofilaments, of 50.3%. A similar module is made containing 501 square feet (46.5 square meters) of active hollow fiber membrane area using the same hollow fibers without coskeined filaments at the same fiber packing density of about 50% as that of the module containing coskeined filaments.

The modules are tested for the drying of air as follows: Moist air at a dew point of 15°–25° C., at a pressure of about 100 psig (7.91×10$^5$ Pascals) and at ambient temperature is supplied to the shell side port of the module. The dry non-permeate product is withdrawn from the shell port at the opposite end of the module. A portion of the dry non-permeate is depressurized and supplied as sweep to the bore side of the hollow fibers countercurrent to the flow of the feed in order to increase the driving force for water permeation. The flow rate, oxygen %, pressure, temperature and dew point for each of the non-permeate, sweep and permeate, and the dew point of the feed are recorded. The data are used to calculate the permeation coefficient for water from an ideal countercurrent flow model. The units of permeation coefficient, i.e., k, are $10^{-6}$ cc/cm$^2$·sec·cmHg. Test loops consisting of a representative sample of the fibers are used to measure the "intrinsic" k for water; this value is dependent only upon the fiber structure and not upon the module design. Flow maldistribution and other factors involved with module design can cause the k for the module to be lower than the intrinsic k. The ratio of the k for a given module to the intrinsic k represents an efficiency factor for that module. The results of the air drying tests on the control module containing only hollow fibers and the "coskeined" module containing the coskeined hollow fibers and filaments are given below.

The coskeined module is tested at an inlet feed flow of 800 slpm (standard liters per minute) and a sweep/feed ratio of 0.35 and produces water removal of 97.3%. The corresponding separator efficiency is 81%. The control module is tested at an inlet feed flow of 700 slpm with a sweep/feed ratio of 0.35 and produces water removal of 96.0%; the control module efficiency is 50%. These data clearly show that for water removal in the range of 96–98%, the efficiency of the coskeined module is considerably higher than that of the control module.

EXAMPLE 6

A coskeined module is assembled using the procedures of Example 4. Polyimide asymmetric hollow fibers having an OD of 325 microns are coskeined with nylon monofilament with an OD of 100 microns. The ratio of coskeined filament to hollow fiber is 1:1. A module of 3.9" (9.91 cm) ID and about 58" (147 cm) active length is assembled from a bundle of the coskeined fibers and filaments. The module contains 729 square feet (67.7m$^2$) of active area at a hollow fiber packing density of 45.9% or a total packing density (fibers and filaments) of 50.3%.

Figure 6:
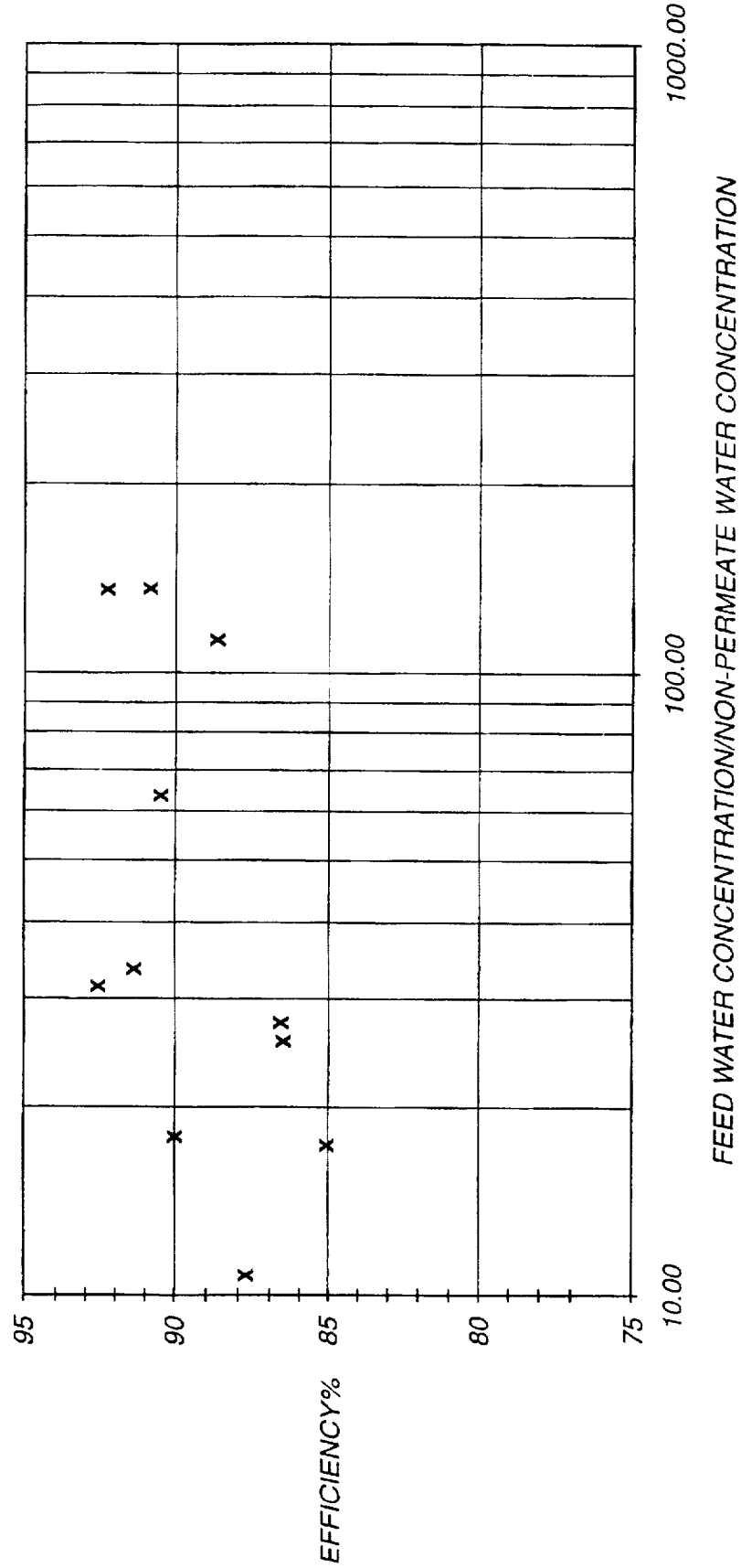
FIG. 6 is a graph depicting the efficiency of another embodiment of the present invention.

The module is tested for air drying as follows: Moist air at a dew point of 15°–25° C., a pressure of about 100 psig (9.91 cm) and at ambient temperature is supplied to the shell side port of the module. The non-permeate is withdrawn from the shell side port at the opposite end of the module. A portion of the dry non-permeate is depressurized and supplied as sweep to the bore side of the hollow fibers countercurrent to the flow of the feed in order to increase the driving force for water permeation. The flow rate, oxygen %, pressure, temperature and dew point for each of the non-permeate, sweep and permeate, and the dew point of the feed are recorded. Such tests are conducted at several feed and sweep flow rates to vary the amount of water removal. The data are used to calculate the water permeation coefficient from an ideal countercurrent flow model. Test loops consisting of a representative sample of the fibers are used to measure the intrinsic k for water. The ratio of the k for the module to the intrinsic k represents an efficiency factor. The results of the air drying tests on the control module and the coskeined module are expressed as plots of k/intrinsic k versus feed water concentration/non-permeate water concentration in FIG. 6.

The results indicate that for feed water/non-permeate water values in the range from about 20 to about 200, the efficiency factor for the coskeined module is 85–92%. It is noted that the efficiency factor for the coskeined module increases as the feed water/non-permeate water ratio increases.

EXAMPLE 7

U.S. Pat. No. 4,293,418 (hereinafter identified as the '418 patent) describes modules assembled from hollow fibers with an OD from 50–600 microns with a spacer yarn with a thickness of 0.5–3 times the OD of the hollow fibers helically wound around 1 or 2 of the hollow fibers. The use of the spacer yarn decreases the active membrane area that can be packed into the inner shell of the module. The following equation for a bundle of fibers according to the '418 patent was derived by assuming that the separation distance between the outer surfaces of two adjacent spacer yarns is the same as that between two adjacent fibers in a bundle containing only fibers. It is also necessary to assume that the spacer yarn is compressible in order to achieve the fiber packing densities set forth in the '418 patent. The following equation was derived to calculate the actual fiber packing density of the module of the '418 patent:

$$\rho_T = \cfrac{1}{\cfrac{1}{\rho_0} + \cfrac{2\sqrt{3}}{\pi} f \cfrac{c^2}{a^2} + \left(\cfrac{2\pi}{3}\right)^{1/2} \cfrac{1}{\rho_0^{1/2}} f \cfrac{c}{a}} \quad (6)$$

where $\rho_T$=actual packing density of fiber in the '418 patent module, $\rho_0$=packing density of fiber bundle not containing any wrapped spacer yarn, c=thickness of wrapped spacer yarn, f=compression factor (accounts for compression of textured spacer yarn by packing the bundle into the shell—actual spacer yarn thickness=fc), a=OD of hollow fiber.

Assuming $\rho_0$=56% (from Example 4), c=200 microns, compression factor f=0.75 and a=325 microns (as in Example 6), it can be calculated from the above equation that $\rho_T$=31.3%. It should be noted that the ratio c/a (0.62) and the calculated packing density 31.3% are within the ranges taught in the '418 patent. A module of the same external dimensions as the one described in Example 6 with the fiber bundle described in the '418 patent will contain 485 square feet (45.1 square meters) of active area.

The calculated performance of the '418 patent module is compared with that of the coskeined module of Example 6. The module efficiencies are assumed to be as follows:

coskeined module=90% as in Example 6 of the present invention

'418 patent module=100%, i.e., the maximum possible Calculations are conducted to simulate the performance of the two modules in the dehydration of natural gas under the following conditions wherein part of the non-permeate is used as sweep on the permeate side:

Feed inlet pressure=1000 psia ($68.9 \times 10^5$ Pascals)
Permeate exit pressure=4 psig ($1.29 \times 10^5$ Pascals)
Temperature=50° C.
Water content in feed gas=800 ppm
Water content in product gas=40 ppm
Sweep gas/feed gas=0.5–4%

Figure 7:
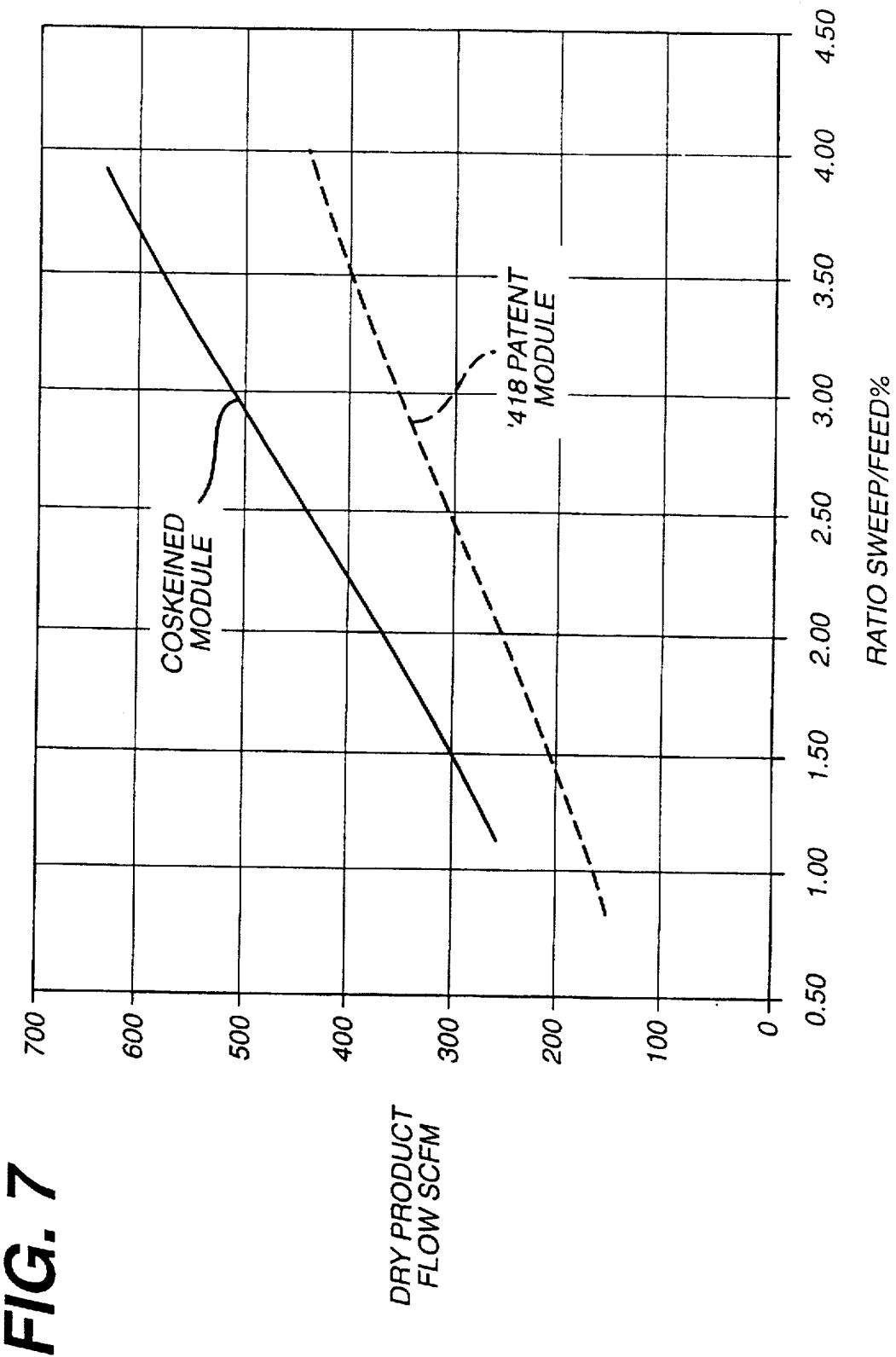
FIG. 7 is a graph comparing the present invention to one prior art patent.

The results are depicted in FIG. 7 as plots of the product flow rate versus the sweep/feed ratio. It should be noted that the product flow of the coskeined module of the present invention is about 1.5 times higher than that of the '418 patent module.

The superior performance of the module of the present invention is because of (1) a greater surface active area, and (2) a lower bore side pressure drop at the same sweep flow rate.

EXAMPLE 8

Attempts are made to assemble a fiber bundle according to the teachings of U.S. Pat. No. 5,198,110 (hereinafter identified as the '110 patent). A delivery system similar to that used for Examples 4, 5, and 6 of the present invention, is used to try to deliver two nylon yarns of 15 denier along with each hollow fiber. The fine denier of the yarn and its stretchability causes the yarn to bounce off the guide pulleys and the yarn becomes entangled in the pulley axles, ultimately causing the yarn to break. A large difference in the OD of the yarn and hollow fiber and a large difference in their tensile strengths, results in an inability to handle the yarn and the hollow fiber on common machinery. Many attempts fail to yield a product which can be tested.

EXAMPLE 9

As described earlier, the pressure drop coefficients for a fiber bundle in the axial direction $K_z$ and radial direction $K_r$ influence the uniformity of flow distribution across the bundle. In particular, it is desirable for the ratio $K_r/K_z$ be as low as possible to improve the uniformity of shell side flow over the cross-section of the bundle. Calculations can be carried out to estimate the value of $K_z$ and $K_r$ for a coskeined fiber bundle of the present invention and for a '110 patent bundle. The equations are given below for radial pressure drop:

$$D_H = \cfrac{2\left[\left(\cfrac{\pi}{2\rho\sqrt{3}}\right)^{1/2} - 1\right] a - mc}{1 + \cfrac{m}{4}}$$

$$\epsilon_r = 1 - \left(\cfrac{2\sqrt{3}}{\pi} \rho\right)^{1/2} \left(1 + \cfrac{mc}{2a}\right) \quad (7)$$

$$K_r = \cfrac{32\mu}{\epsilon_r D_H^2} \quad (8)$$

where, $D_H$=hydraulic diameter of flow channel,
$\rho$=packing density of hollow fiber alone,
a=OD of the hollow fiber,
c=diameter of the filament,
m=the number of filaments per hollow fiber,
$\epsilon_r$=the void fraction in the radial direction,
$\mu$=the viscosity of the gas.

The equations for the axial pressure drop coefficient were given earlier.

The above equations are applied to calculate the values for $K_z$ and $K_r$ for a coskeined fiber bundle of the present invention and for a '110 patent bundle with the following parameter values and the same total packing density for both bundles:

Hollow fiber OD, a=325 microns

Coskeined bundle, m=1, c=100 microns (70 denier)

'110 patent bundle, m=4, c=51 microns (20 denier)

The calculations indicate the following results:

|  | Coskeined Bundle | '110 Patent Bundle |
|---|---|---|
| Total Packing Density | 51.5% | 51.5% |
| $K_z$ | 17.4 g/cm³/s | 27.5 g/cm³/s |
| $K_r/K_z$ | 12.5 | 625 |

The lower the ratio of the pressure drop coefficient for the radial direction to the pressure drop coefficient for the axial direction ($K_r/K_z$), the more uniform the flow distribution in the bundle. Hence, the data indicate by a ratio of about 50/1 (625/12.5) that the coskeined bundle has a more uniform flow distribution than the '110 patent bundle.

The suggested maximum filament diameter that can be used in a practical sense for coskeining was earlier defined from considerations of geometry for one filament per hollow fiber (see Equation 8 for a cubic arrangement of hollow fibers and the corresponding table). For multiple filaments per hollow fiber, criteria can be derived to determine desirable values for the maximum filament diameter as a function of the number of filaments per hollow fiber and the fiber packing density. The basis used will be the theoretical value of $K_r/K_z$; this value should be less than 200. It can be shown from the previously given equations that:

$$\frac{K_r}{K_z} = \frac{\left\{1 - \rho\left(1 + m\frac{c^2}{a^2}\right)\right\}^3}{\left\{1 - \left(\frac{2\sqrt{3}}{\pi}\rho\right)^{1/2}\left(1 + \frac{mc}{2a}\right)\right\}\left\{\rho\frac{\left(1 + m\frac{c}{a}\right)}{\left(1 + \frac{m}{4}\right)}\left[2\left\langle\left(\frac{\pi}{2\rho\sqrt{3}}\right)^{1/2} - 1\right\rangle - m\frac{c}{a}\right]\right\}^2} = < 200 \quad (9)$$

where c/a=filament diameter/hollow fiber OD

ρ=packing density of fiber alone m=number of filaments per hollow fiber.

By setting the value for $K_r/K_z$ at 200, the relationship between the variables c/a, ρ, and m can be established. This relationship is plotted in FIG. 8 for a fiber packing density of 50%. The desirable range for filament diameters in accordance with the present invention is defined by the shaded portion under the plot line for the 200 value.

Figure 8:
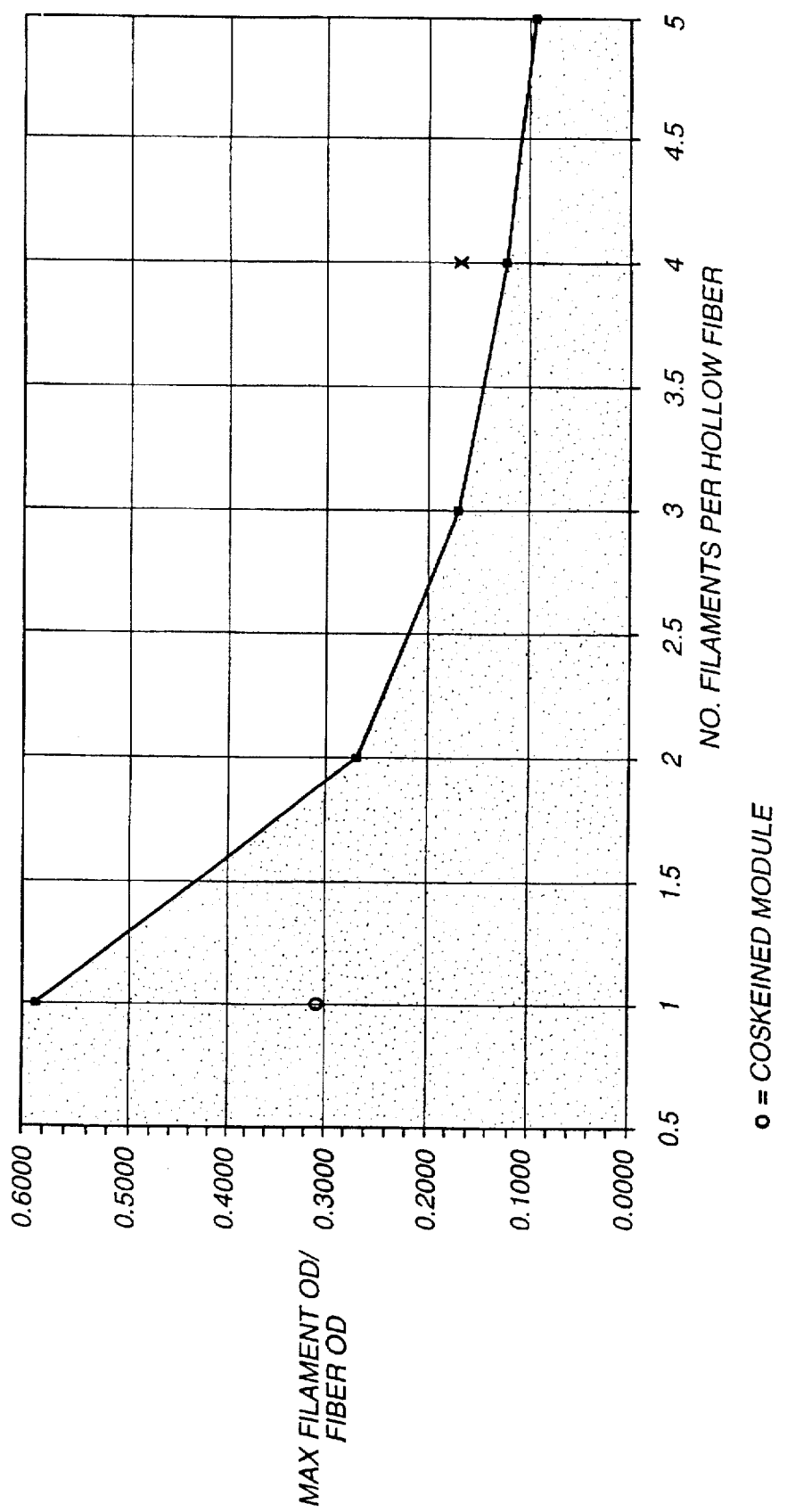
FIG. 8 is a graph comparing the present invention to another prior art patent.

For comparative purposes, the values of the variables for Example 9 are specifically delineated in FIG. 8. It should be noted that the value for the '110 patent module lies above the plot line whereas the value for the present invention according to Example 9 falls within the shaded region.

Preferred filament diameters for coskeining at given values of fiber packing density and number of filaments per hollow fiber can be defined as being smaller than the lower of the values obtained from (a) Equation 7 and (b) Equation 8 wherein $K_r/K_z$=200.

Table 7 below sets forth additional comparative data based on calculations of the expected values of $K_z$ and $K_r/K_z$ for coskeined modules versus the '110 patent. The ranges covered by the '110 patent are as follows:

a=100–1000 microns c=0.05–20 denier (2.5–49.6 microns)

m=2–3000.

TABLE 7

| Sample | Fiber OD micr | Filam OD micr | No. Filam per Fiber | Pack Dens % Fibr only | Fiber Bundle Dia cm | Gas Visc cP | Fil OD/ Fib OD | $K_r$ g/cm³/s | $K_z$ g/cm³/s | $K_r/K_z$ |
|---|---|---|---|---|---|---|---|---|---|---|
| Cos | 100 | 60.0 | 1 | 40 | 9.946 | 0.0174 | 0.6000 | 3760.54 | 241.28 | 15.59 |
| 110 | 100 | 2.5 | 4 | 40 | 9.946 | 0.0174 | 0.0250 | 885.72 | 50.39 | 17.58 |
| 110 | 100 | 18.0 | 2 | 40 | 9.946 | 0.0174 | 0.1800 | 1364.45 | 87.41 | 15.61 |
| Cos | 1000 | 900.0 | 1 | 40 | 9.946 | 0.0174 | 0.9000 | 1891.02 | 15.70 | 120.42 |
| 110 | 1000 | 2.5 | 19 | 40 | 9.946 | 0.0174 | 0.0025 | 61.89 | 0.47 | 130.39 |
| 110 | 1000 | 49.6 | 10 | 40 | 9.946 | 0.0174 | 0.0496 | 149.96 | 1.00 | 149.53 |

Cos = Coskeined Module
110 = '110 Patent Module

When using the small fiber having an OD of 100 microns coskeined with 60 micron filament with a filament to fiber ratio of 1:1, the $K_r/K_z$ value is 15.6. For a comparable value of $K_r/K_z$, the '110 patent requires 4 filaments of the lowest denier (2.5 microns) or 2 filaments of 18 micron size. The coskeined module produces a much higher value for $K_z$ (240) compared to the '110 patent values of 50 and 87 respectively. Hence, the coskeined module is expected to provide superior performance.

For a larger fiber of 1000 microns OD coskeined with 900 OD microns, filaments at a ratio of 1:1 filament to fiber the $K_r/K_z$ value is 120. For a comparable value of $K_r/K_z$ the '110 patent module requires 19 filaments of the lowest denier (2.5 microns) and 10 filaments of the largest denier (49.6 microns). The coskeined module yields a $K_z$ value of 16 compared to a value of 0.5 and 1 respectively for the two deniers of the '110 patent module. Once again, the coskeined module is expected to provide superior performance.

EXAMPLE 10

Asymmetric hollow fiber membranes of polysulfone polymer with OD of 460 microns are utilized to produce nitrogen from air in one module containing coskeined fiber and one module containing only the hollow fiber membranes. The module containing the coskeined filaments contains nylon monofilament having an OD of 100 microns and has a ratio of filaments to hollow fibers of 1:1. The module has an ID of about 3.9" (9.91 cm) and an active fiber length of about 39" (99.1 cm). The module contains about 256 square feet (23.8m$^2$) of active membrane surface area at a total packing density including fibers and filaments of 37.3%. This module is identified as "A". Both ends of the module are potted and the tubesheets are opened to expose the fiber bores. The module shell is provided with one port at each end, close to the tubesheets, for flow of gas on the shell side (See FIG. 1). Ports are also provided at the ends for the flow of gas on the bore side of the hollow fibers.

A similar module is assembled using the same hollow fiber membranes but without the coskeined filaments. This control module contains 327 square feet (30.4m$^2$) of active membrane surface area and has a packing density of about 45%. This module is identified as "B".

Figure 9:
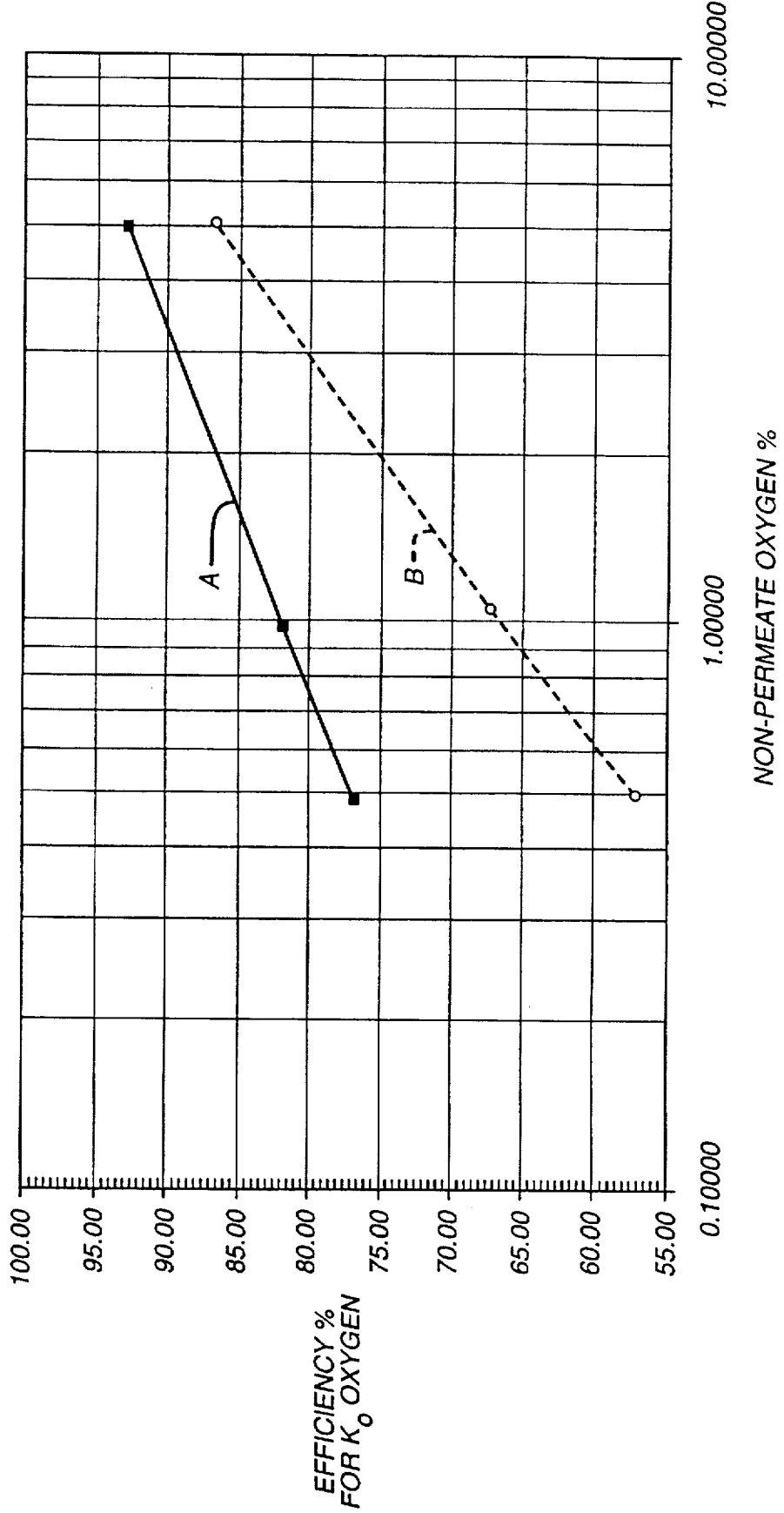
FIG. 9 is a graph depicting the efficiency of an embodiment of the present invention.
Figure 10:
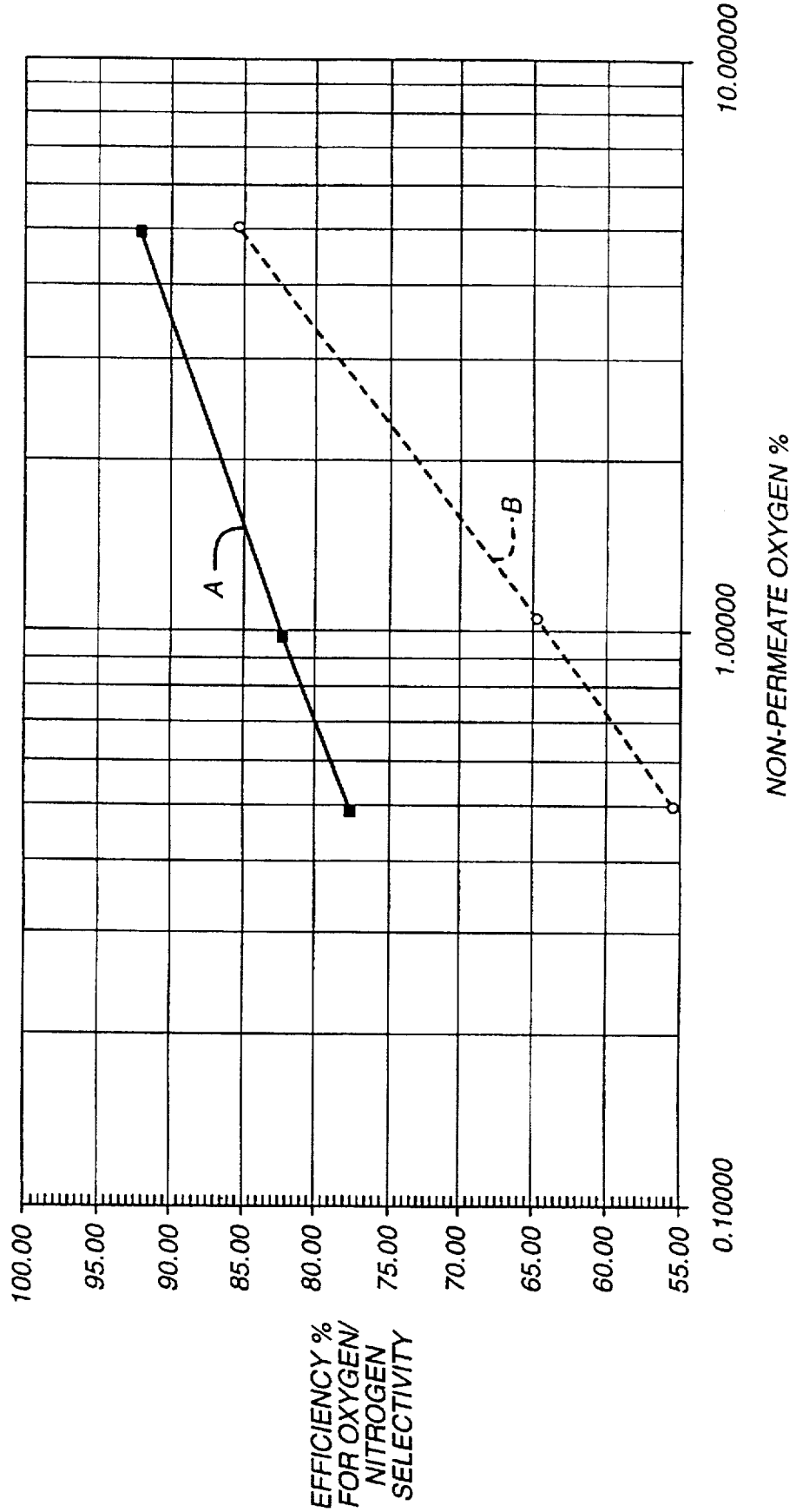
FIG. 10 is a graph depicting the efficiency of another embodiment of the present invention.

Each module is tested with dry air at about 95 psig and at room temperature by feeding the dry air to the shell side of the hollow fibers while the bore side of the hollow fibers is at atmospheric pressure. The flow rate of the nitrogen enriched non-permeate is adjusted to produce oxygen concentrations of 0.5%, 1%, and 5%. These data are used to estimate the permeation coefficients for oxygen and nitrogen. A test is also conducted at a high non-permeate flow rate to yield an oxygen concentration in the non-permeate reaching about 19%, i.e. about the same as the feed air. These data can be utilized to estimate the "intrinsic" permeation coefficients of oxygen and nitrogen for the hollow fiber membranes. The ratio of the actual permeation coefficient to the corresponding "intrinsic" values provides an efficiency factor. FIG. 9 depicts the efficiency factor based on the oxygen permeation coefficient plotted as a function of the non-permeate oxygen per cent for the two modules "A" and "B". FIG. 10 depicts the efficiency factors based on the oxygen/nitrogen selectivity plotted as a function of the non-permeate oxygen per cent for the two modules "A" and "B".

The test results indicate that the efficiency factors in FIGS. 9 and 10 are higher for the module A containing the coskeined fiber and filaments and that the factors decrease more gradually as the non-permeate oxygen per cent is decreased as compared with the "control" module B. For example, at a non-permeate oxygen level of 0.5%, the efficiency factor for the module A is 77–78% as compared with 55–57% for the module B.

The performance data for the two modules are depicted in Table 8. It should be noted that under similar operating conditions of temperature and pressure, module A produces more nitrogen product even though the active membrane surface area is substantially less (about 22%) than that of module B. Another performance factor, related to the energy consumption for the process, is the amount of nitrogen product produced per unit of feed air (also identified as "product recovery"). The product recovery is higher for module A when compared with module B. For instance, when the process is carried out to yield a non-permeate product having 0.5% oxygen, module A produces product at a rate of 8.5 slpm (standard liters per minute) resulting in a product recovery value of 15.9% compared to 4.5 slpm of product resulting in a product recovery value of 8.1% for module B. Thus when the oxygen content of the non-permeate product is about 0.5%, the product flow rate for module A is 89% higher and the product recovery value is 96% higher than when the same process is performed using module B.

TABLE 8

| Module ID# Test | Area m$^2$ | Feed Pressure Pascals ×10$^5$ | Feed Temp °C. | Feed Flow slpm | NP flow slpm | NP O$_2$ % | NP Flow slpm per m$^2$ | Recovery NP/Feed % |
|---|---|---|---|---|---|---|---|---|
| A-1 | 23.8 |  | 23 | 59.2 | 13.3 | 0.98 | 0.56 | 22.5 |
| A-2 | 23.8 | 7.54 | 23 | 53.3 | 8.5 | 0.50 | 0.36 | 15.9 |
| B-1 | 30.4 | 7.76 | 23 | 65.2 | 11.0 | 1.06 | 0.37 | 16.9 |
| B-2 | 30.4 | 7.76 | 23 | 55.7 | 4.5 | 0.50 | 0.15 | 8.1 |

EXAMPLE 11

The two modules of Example 10 are utilized in the drying of air. Moist air having a dew point of 20°–25° C. is placed under pressure of about 100 psig (7.91×10$^5$ Pascals) and supplied to the shell side port of a module. The dry non-permeate product is withdrawn from the shell side port at the opposite end of the module. A portion of the dry non-permeate product is depressurized and supplied as sweep to the bore side of the hollow fiber membranes countercurrent to the feed in order to increase the driving force for permeation of water through the membranes. Data are recorded for the flow rates, oxygen content, pressure, temperature and dew point of each of the non-permeate, sweep and permeate. The tests are conducted at a fixed feed flow rate while varying the sweep flow rate resulting in different amounts of water removal. The data are used to calculate the permeation coefficient of water, i.e., overall transport coefficient, from an ideal countercurrent flow model. The units of the permeation coefficient k are 10$^{-6}$ std cc/cm$^2$·sec·cmHg. The results of the air drying test on modules A and B are expressed as plots of k versus the feed water concentration/non-permeate water concentration in FIG. 11.

The results indicate that for the feed water concentration/non-permeate water concentration values in the range of about 20–200, the k for module A is greater and decreases more gradually as the feed water concentration/nonpermeate water concentration ratio is increased compared to module B. For example, at a feed water concentration/nonpermeate water concentration ratio of 50, the value of k for module A is 950 compared to 640 for module B.

The performances of the two modules are compared in Table 9 at approximately the same feed pressure, permeate/feed ratio and net product flow rate. It should be noted that even though module A has substantially less active membrane surface area, the coskeined module A produces a higher amount of water removal. For example, at a permeate/feed ratio of 35%, module A test 2 produces a net product flow rate of 19.2 slpm per m² of active membrane surface area while removing 99.3% of the water, compared to a net product flow rate of 15.0 slpm per m² of active membrane surface area while removing 98.5% for module B test 2.

TABLE 9

| Module ID# Test | Area m² | Feed Pressure Pascals ×10⁵ | Feed Temp °C. | Permeate/ Feed Ratio % | NP net flow slpm | H₂O Rem oval % | NP net Flow slpm per m² |
| --- | --- | --- | --- | --- | --- | --- | --- |
| A-1 | 23.8 | 7.42 | 23 | 24.9 | 526.2 | 97.4 | 22.2 |
| A-2 | 23.8 | 7.42 | 23 | 35.1 | 454.2 | 99.3 | 19.2 |
| B-1 | 30.4 | 7.42 | 23 | 25.0 | 526.2 | 95.9 | 17.3 |
| B-2 | 30.4 | 7.42 | 23 | 35.4 | 454.2 | 98.5 | 15.0 |

The hollow fibers for use in the present invention may be straight or have waves which are formed during the manufacturing process. The waves may have an amplitude of 0.5–1000 times the outer diameter of the fiber, and a frequency of 0.2–50 per inch (0.07–4 per cm) of straight fiber length. The fiber may also contain sections of larger OD and ID along the length. Such sections may have an OD of 1.2–5 times the normal OD and ID and a frequency of 0.2–10 per inch (0.07–4 per cm). However, it is generally preferred to use fibers that are substantially uniform in OD and ID.

The filaments for use in the present invention may have a variety of shapes and thicknesses in order to assist in producing uniform flow distribution on the shell side. For, example, a filament containing sections of larger OD along its length may be used; such a filament is called a "subbed" filament. The enlarged diameter sections or "slubs" may have a diameter of 1.2–100 times the normal diameter of the filament and a frequency of 0.2–10 per inch. The geometry of the "slubs" is selected to produce uniform flow distribution on the shell side along with low hydraulic resistance (or low pressure drop).

The present invention also provides a process for controlling the quantity of a dissolved gas in a liquid to a predetermined level. The process comprises placing the liquid under a predetermined pressure and transporting the pressurized liquid to the shell side or the bore side of a gas/liquid contactor module containing a bundle of hollow fiber membranes which are of substantially uniform inner and outer diameters, the bundle having randomly dispersed therein filaments having an outer diameter no more than three times that of the hollow fibers but substantially the same length as the hollow fibers, the hollow fibers having an outer diameter from about 100 to about 3000 microns and the filaments having an outer diameter from about 60 to about 3000 microns, the filaments being present in number from about 0.5 to about 5 times the number of hollow fibers.

A is gas placed under pressure on the side of the hollow fiber membranes opposite the liquid, and the gas pressure is increased or decreased to obtain the desired quantity of the dissolved gas in the liquid.

We claim:

1. A fluid separation module comprising:

(a) a bundle of hollow fiber membranes which are of substantially uniform inner and outer diameters, the bundle having randomly dispersed therein filaments having an outer diameter equal to or less than that given by the following expression: $\alpha \cdot |(1.2533/\rho^{0.5})-1|$ wherein $\alpha$ represents the outer diameter of the hollow fiber and $\rho$ represents the packing density of the hollow fibers expressed as a fraction, the packing density of the hollow fibers being greater than 30% the hollow fibers having an outer diameter from about 100 to about 3000 microns and the filaments having an outer diameter of at least about 60 microns, the filaments being present in number from about 0.5 to about 5 times the number of hollow fibers;

(b) substantially all of the filaments occupying the void volume between adjacent fibers; and (c) at least one tubesheet wherein the hollow fibers and filaments are embedded therein and at least the hollow fibers penetrate the tubesheet.

2. The module of claim 1 wherein the filaments are substantially parallel to the hollow fibers.

3. The module of claim 1 wherein the membranes are selected from a group consisting of (a) polymeric, integrally skinned, asymmetric hollow fibers;

(b) dense walled, polymeric hollow fibers;

(c) thin film, composite polymeric hollow fibers;

(d) polymeric hollow fibers surface-modified by reactive species;

(e) polymeric hollow fibers containing an active transport agent;

(f) hollow tubes of porous, ceramic material with a selective layer;

(g) hollow tubes of ion transport, ceramic material;

(h) glass fibers; and (i) carbon fibers.

4. The module of claim 1 wherein the hollow fiber membranes are prepared from polymers selected from a group including substituted or unsubstituted polysulfone, polystyrene, acrylonitrile-styrene copolymer, styrene-butadiene copolymer, styrene-vinylbenzylhalide copolymer, polycarbonate, cellulose acetate, cellulose propionate, ethyl cellulose, methyl cellulose, nitrocellulose, polyamide, polyimide, aryl polyamide, aryl polyimide, polyether, polyetherimide, polyarylene oxide, polyphenylene oxide, polyxylylene oxide, polyesteramide-diisocyanate, polyurethane, polyester, polyarylate, polyethylene terephthalate, polyalkyl methacrylate, polyalkyl acrylate, polyphenylene terephthalate, polysulfide, polysiloxane, polyethylene, polypropylene, polybutene-1, poly-4-methyl pentene-1, polyvinyl chloride, polyvinyl fluoride, polyvinylidene chloride, polyvinylidene fluoride, polyvinyl alcohol, polyvinyl acetate, polyvinyl propionate, polyvinyl pyridine, polyvinyl pyrrolidone, polyvinyl ether, polyvinyl ketone, polyvinyl aldehyde, polyvinyl formal, polyvinyl butyral, polyvinyl amine, polyvinyl phosphate, polyvinyl sulfate, polyacetal, polyallyl, polybenzobenzimidazole, polyhydrazide, polyoxadiazole, polytriazole, polybenzimidazole, polycarbodiimide, polyphosphazine, polypropylene oxide, and interpolymers, block interpolymers, copolymers, block copolymers, grafts and blends of the foregoing.

5. The module of claim 1 wherein the filaments are inert materials.

6. The module of claim 5 wherein the inert materials are selected from a group consisting of nylon, polyamides, polyaramides, polyester, acrylic, polypropylene, graphite, metals and glass.

7. The module of claim 1 wherein the filaments are threads, multiple-filament untwisted yarn, multiple-filament twisted yarn or monofilaments.

8. The module of claim 1 wherein the filaments have sections of enlarged diameter along their length.

9. The module of claim 1 wherein the packing density of the hollow fiber membranes is from about 30 to about 75%.

10. The module of claim 1 wherein the separation module when utilized for fluid separation has a bore side of the hollow fiber membranes containing at least one gas and a shell side of the hollow fiber membranes containing one or more gases or a liquid.

11. The module of claim 1 wherein the separation module when utilized for fluid separation has a bore side of the hollow fiber membranes containing liquid and a shell side of the hollow fiber membranes containing one or more gases.

* * * * *